(12) United States Patent
Yamada

(10) Patent No.: US 10,437,812 B2
(45) Date of Patent: Oct. 8, 2019

(54) INFORMATION PROCESSING METHOD, INFORMATION PROCESSING DEVICE, AND MEDIUM

(71) Applicant: MURAKUMO CORPORATION, Tokyo (JP)

(72) Inventor: Hiroyuki Yamada, Tokyo (JP)

(73) Assignee: MURAKUMO CORPORATION, Meguro-ku (JP)

( * ) Notice: Subject to any disclaimer, the term of this patent is extended or adjusted under 35 U.S.C. 154(b) by 631 days.

(21) Appl. No.: 14/744,877

(22) Filed: Jun. 19, 2015

(65) Prior Publication Data

US 2015/0286672 A1    Oct. 8, 2015

Related U.S. Application Data

(63) Continuation of application No. PCT/JP2012/083289, filed on Dec. 21, 2012.

(51) Int. Cl.
*G06F 17/30* (2006.01)
*G06F 16/23* (2019.01)
*G06F 16/27* (2019.01)

(52) U.S. Cl.
CPC ...... *G06F 16/2358* (2019.01); *G06F 16/2365* (2019.01); *G06F 16/27* (2019.01)

(58) Field of Classification Search
CPC ......... G06F 17/30368; G06F 17/30371; G06F 17/30575; G06F 16/2358; G06F 16/2365; G06F 16/27

See application file for complete search history.

(56) References Cited

U.S. PATENT DOCUMENTS

| 5,170,480 A | 12/1992 | Mohan et al. |
| 5,353,410 A | 10/1994 | Macon, Jr. et al. |
| 2006/0010309 A1 | 1/2006 | Chaudhry et al. |
| 2006/0069885 A1 | 3/2006 | Matsui et al. |
| 2006/0085462 A1 | 4/2006 | Todd |

(Continued)

FOREIGN PATENT DOCUMENTS

| EP | 2410431 A1 | 1/2012 |
| JP | 3-122729 A | 5/1991 |

(Continued)

OTHER PUBLICATIONS

International Search Report dated Feb. 26, 2013 issued in corresponding application No. PCT/JP2012/083289 (2 pages).

(Continued)

*Primary Examiner* — Huawen A Peng
(74) *Attorney, Agent, or Firm* — Westerman, Hattori, Daniels & Adrian, LLP

(57) ABSTRACT

A computer which updates the computer's own database in use of a transaction log: acquires the transaction log; processes records in the acquired transaction log, and with respect to a record related to an update instruction, executes the update instruction represented by the record when an object of the update instruction is read onto a memory of the computer; and executes the update instruction put on standby with respect to the object either until the object of the update instruction put on standby is read onto the memory and becomes a processing object, or when the update instruction put on standby has been read onto the memory and become a processing object.

22 Claims, 15 Drawing Sheets

(56) References Cited

U.S. PATENT DOCUMENTS

| | | |
|---|---|---|
| 2006/0136367 A1 | 6/2006 | Todd |
| 2007/0271313 A1 | 11/2007 | Mizuno et al. |
| 2010/0250491 A1* | 9/2010 | Jin .................. G06F 17/30575 707/634 |
| 2011/0093440 A1 | 4/2011 | Asakura et al. |
| 2011/0178984 A1 | 7/2011 | Talius et al. |
| 2012/0011098 A1 | 1/2012 | Yamada |
| 2012/0109895 A1 | 5/2012 | Zwilling et al. |
| 2013/0006930 A1 | 1/2013 | Taniguchi et al. |
| 2013/0067033 A1 | 3/2013 | Wu |

FOREIGN PATENT DOCUMENTS

| | | |
|---|---|---|
| JP | 2006-106868 A | 4/2006 |
| JP | 2007-501449 A | 1/2007 |
| JP | 2007-264685 A | 10/2007 |
| JP | 2007-310701 A | 11/2007 |
| JP | 2012-133417 A | 7/2012 |
| WO | 2010/106991 A1 | 9/2010 |

OTHER PUBLICATIONS

Extended (supplementary) European Search Report dated May 23, 2016, issued in counterpart European Patent Application No. 12890487. 7. (13 pages).

Anonymous: "Readers-writer lock—Wikipedia, the free encyclopedia", Nov. 12, 2012, XP055269027.

Extended (supplementary) European Search Report dated Oct. 20, 2017, issued in counterpart application No. 14886733.6. (10 pages).

Extended (supplementary) European Search Report dated Nov. 8, 2017 issued in counterpart application No. 14887142.9. (8 pages).

* cited by examiner

FIG. 6

| LSN | 32 | 33 | 34 | 35 | 36 | 37 | 38 | 39 | 40 |
|---|---|---|---|---|---|---|---|---|---|
| | XB1 | D1_101_5 | XB2 | I2_205_2 | D1_103_2 | XC1 | D2_104_9 | I2_206_8 | XC2 |

INFORMATION PROCESSING METHOD, INFORMATION PROCESSING DEVICE, AND MEDIUM

CROSS-REFERENCE TO RELATED APPLICATION

This application is a continuation application of International Application PCT/JP2012/083289 filed on Dec. 21, 2012 and designated the U.S., the entire contents of which are incorporated herein by reference.

FIELD

The present invention relates to an information processing method, an information processing device, and a program.

BACKGROUND

Techniques for using a transaction log created by a master to perform replication with another master or a slave are recently being proposed. In particular, a technique for performing replication by synchronizing the other master or the slave with the master is proposed. In this case, a transaction log shows a history of changes made to a database.

FIG. 1 shows two methods of performing replication by synchronizing another master or a slave with a master. In a first method (a method depicted by solid lines), a transaction log generated by a master is transmitted to another master or a slave, and after an update of a database is completed by the other master or the slave, an ACK is returned to the master. Subsequently, a commit to an object transaction is completed.

In the first method, since the commit to the object transaction is not completed until the update of the database by the other master or the slave is completed, processing of an entire system is slowed down. FIG. 1 shows a second method (a method depicted by dotted lines) as an improvement of the first method.

In the second method, at a point when reception of a transaction log by the other master or the slave is completed, an ACK is returned to the master regardless of whether or not the transaction log is applied. Therefore, according to the second method, the time required to complete the commit to the transaction can be reduced and performance of the overall system can be improved.

However, with the second method, when a retrieval process occurs at the other master or the slave before the replication is completed, there is a possibility that a data content which differs from the master may be referred to. As a countermeasure, a method may sometimes be used in which execution of the retrieval process that has occurred at the other master or the slave is put on standby until the replication is completed (WO 2010/106991).

SUMMARY

One fundamental problem of performing replication using a transaction log created by a master is that processing for applying the transaction log to a database at another master or a slave takes time. This is because a conventional transaction log serially records transactions processed in parallel by the master in an order in which the transactions had been processed, and since the other master or the slave must apply records of the transaction log to the database one at a time from the earliest to the latest, processing executed in parallel by the master must now be executed in series.

Therefore, even when the second method is used, processing for applying the transaction log to the database takes time and slows down the execution of a retrieval process occurring at the other master or the slave. As a result, performance may not be sufficiently improved.

As a solution to this problem, a third method shown in FIG. 2 is proposed (for example, Japanese Patent Application Laid-open No. 2012-133417). In the third method, a master creates a plurality of transaction logs in parallel and transmits the plurality of transaction logs created in parallel to another master or a slave. Subsequently, the plurality of transaction logs are applied to a database in parallel at the other master or the slave.

According to the third method, since transaction logs can be applied in parallel to the database of the other master or the slave, it appears as though the speed of processing for applying the transaction logs to the database is increased. However, the third method has the following problems.

As a first problem, techniques related to transaction logs are techniques related to the foundation of databases which are employed for recovery from failure and the like. Meanwhile, in conventional systems, transaction logs are created in series. Therefore, implementing the third method in a conventional system involves the risk of making a system change in a portion related to the foundation of a database.

As second problem, in a conventional transaction log, records are retained in an order in which the records had been applied to a database. Therefore, by applying the transaction logs to a database in its original order, the other master or the slave can attain consistency with the database of the master even during execution of replication.

On the other hand, when transaction logs are parallelized, there is no guarantee that the same processing is executed by the other master or the slave in the same order. Therefore, the master or the slave is no longer able to attain consistency with the database of the master during execution of replication.

In consideration of cases where a retrieval process is executed while replication is being executed by the other master or the slave, in order to attain consistency with the database of the master, the master or the slave is provided with a mechanism for determining an order of application of transaction logs that are parallelized. Therefore, implementing the third method causes the system to become more complicated.

As a third problem, while the number of transactions that are processed in parallel changes depending on circumstances, the number of transaction logs that are created in parallel is fixed. Therefore, with the third method, since the problem of an imbalance between the number of transactions and the number of transaction logs remains fundamentally unsolved, the speed of processing for applying the transaction logs to a database may not necessarily be increased.

An aspect of the present invention has been made in consideration of the above and an object thereof is to increase the speed of processing for applying transaction logs to update a database.

A first mode of the present invention is an information processing method causing a computer which updates the computer's own database in use of a transaction log to execute: acquiring the transaction log; processing records in the acquired transaction log by sequentially referring to the records in the acquired transaction log from the first record, and with respect to a record related to an update instruction for updating data included in the database from among records included in the transaction log, executing the update instruction represented by the record when an object of the update instruction is read onto a memory of the computer and putting execution of the update instruction represented by the record on standby when an object of the update instruction is not read onto the memory of the computer; and executing the update instruction put on standby with respect to the object either until the object of the update instruction put on standby is read onto the memory and becomes a processing object, or when the update instruction put on standby has been read onto the memory and become a processing object.

According to the first mode of the present invention, an acquired transaction log is sequentially referred and processed from the first record. In this processing, with respect to a record related to an update instruction for updating data included in the database among records included in the transaction log, when an object of the update instruction is read onto a memory of the computer, the update instruction represented by the record is executed. On the other hand, when the object of the update instruction is not read onto the memory, execution of the update instruction represented by the record is put on standby. Subsequently, the update instruction put on standby with respect to the object is executed either until the object of the update instruction put on standby is read onto the memory and becomes a processing object or upon the update instruction put on standby being read onto the memory and becoming a processing object.

One reason of the difficulty of increasing the speed of processing for updating a database using a transaction log is the slow speed of processes of reading and writing data relative to other processes when updating the database. The first mode of the present invention executes processing on update instructions that do not require data to be read out from a database. On the other hand, the first mode of the present invention puts off execution of processing on update instructions that require data to be read out from a database. Therefore, according to the first mode of the present invention, processes of reading and writing data when updating a database by applying a transaction log can be performed in an efficient manner. In addition, update instructions put on standby can be processed in parallel.

Therefore, according to the first mode of the present invention, the speed of processing for applying a transaction log to a database can be increased.

A second mode of the present invention is the information processing method according to the first mode, further causing the computer to, when acquiring the transaction log, acquire a transaction log created in series by another computer in order to perform replication between a database of the other computer and the computer's own database.

A third mode of the present invention is the information processing method according to the first or second mode, further causing the computer to, when putting execution of an update instruction represented by the record on standby, record at least either one of contents of the update instruction put on standby and a number of the record in map information in association with the object of the update instruction in order to show that an update instruction put on standby exists with respect to the object of the update instruction, and execute the update instruction put on standby with respect to the object by referring to the map information.

A fourth mode of the present invention is the information processing method according to the first or second mode, further causing the computer to, read a processing object onto the memory for each predetermined set, when putting execution of an update instruction represented by the record on standby, record at least either one of contents of the update instruction put on standby and a number of the record in map information in association with a predetermined set including the object of the update instruction in order to show that an update instruction put on standby exists with respect to the object of the update instruction, and execute the update instruction put on standby with respect to an object included in the predetermined set by referring to the map information either until the predetermined set is read onto the memory and becomes a processing object, or when the predetermined set has been read onto the memory and become a processing object.

A fifth mode of the present invention is the information processing method according to any one of the first to fourth modes, further causing the computer to put a retrieval process to be implemented on the computer's own database on standby until processing on a record of the transaction log that is required to be processed in relation to the retrieval process is completed.

A sixth mode of the present invention is an information processing method causing a computer which updates the computer's own database in use of a transaction log to execute: acquiring the transaction log; processing records in the acquired transaction log by sequentially referring to records in the acquired transaction log from the first record, and with respect to a record related to an update instruction for updating data included in the database from among the records included in the transaction log, putting execution of the update instruction on standby; and executing the update instruction put on standby with respect to an object of the update instruction put on standby either until the object of the update instruction put on standby becomes a processing object, or when the object of the update instruction put on standby has become a processing object.

A seventh mode of the present invention is the information processing method according to the sixth mode, further causing the computer to, when acquiring the transaction log, acquire a transaction log created in series by another computer in order to perform replication between a database of the other computer and the computer's own database.

An eighth mode of the present invention is the information processing method according to the sixth or seventh mode, further causing the computer to, when putting execution of the update instruction on standby, record at least either one of contents of the update instruction and a number of a record related to the update instruction in map information in association with an object of the update instruction in order to show that an update instruction put on standby exists with respect to the object of the update instruction, and execute the update instruction put on standby with respect to the object by referring to the map information.

A ninth mode of the present invention is the information processing method according to the sixth or seventh mode, further causing the computer to: read a processing object onto the memory for each predetermined set; when putting execution of the update instruction on standby, record at least either one of contents of the update instruction put on standby and a number of the record in map information in association with a predetermined set including an object of the update instruction in order to show that an update instruction put on standby exists with respect to the object of the update instruction; and execute the update instruction put on standby with respect to an object included in the predetermined set by referring to the map information either until the predetermined set becomes a processing object, or when the predetermined set has become a processing object.

A tenth mode of the present invention is the information processing method according to any one of the sixth to ninth modes, further causing the computer to put a retrieval process to be implemented on the computer's own database on standby until processing on a record of the transaction log that is required to be processed in relation to the retrieval process is completed.

Moreover, possible alternative aspects of the information processing methods according to the respective modes described above may include an information processing device, an information processing system, and a program which realize the respective configurations described above, and a storage medium which is readable by a machine such as a computer and other devices and in which such a program is recorded. In this case, a recording medium that is readable by a computer or the like refers to a medium which stores information such as a program by an electric action, a magnetic action, an optical action, a mechanical action, or a chemical action. In addition, an information processing system may be realized by one or a plurality of information processing devices.

For example, an eleventh mode of the present invention is an information processing device that updates the device's own database in use of a transaction log, the information processing device including: means for acquiring the transaction log; means for processing records in the acquired transaction log by sequentially referring to the records in the acquired transaction log from the first record, and with respect to a record related to an update instruction for updating data included in the database from among records included in the transaction log, executing the update instruction represented by the record when an object of the update instruction is read onto a memory of the computer and putting execution of the update instruction represented by the record on standby when an object of the update instruction is not read onto the memory of the computer; and means for executing the update instruction put on standby with respect to the object either until the object of the update instruction put on standby is read onto the memory and becomes a processing object, or when the update instruction put on standby has been read onto the memory and become a processing object.

In addition, for example, a twelfth mode of the present invention is a program causing a computer which updates the computer's own database in use of a transaction log to execute: acquiring the transaction log; processing records in the acquired transaction log by sequentially referring to the records in the acquired transaction log from the first record, and with respect to a record related to an update instruction for updating data included in the database from among records included in the transaction log, executing the update instruction represented by the record when an object of the update instruction is read onto a memory of the computer and putting execution of the update instruction represented by the record on standby when an object of the update instruction is not read onto the memory of the computer; and executing the update instruction put on standby with respect to the object either until the object of the update instruction put on standby is read onto the memory and becomes a processing object, or when the update instruction put on standby has been read onto the memory and becomes a processing object.

Furthermore, for example, a thirteenth mode of the present invention is an information processing device that updates the device's own database in use of a transaction log, the information processing device including: means for acquiring the transaction log; means for processing records in the acquired transaction log by sequentially referring to records in the acquired transaction log from the first record, and with respect to a record related to an update instruction for updating data included in the database from among the records included in the transaction log, putting execution of the update instruction on standby; and means for executing the update instruction put on standby with respect to an object of the update instruction put on standby either until the object of the update instruction put on standby becomes a processing object, or when the object of the update instruction put on standby has become a processing object.

In addition, for example, a fourteenth mode of the present invention is a program causing a computer which updates the computer's own database in use of a transaction log to execute: processing records in the acquired transaction log by sequentially referring to records in the acquired transaction log from the first record, and with respect to a record related to an update instruction for updating data included in the database from among the records included in the transaction log, putting execution of the update instruction on standby; and executing the update instruction put on standby with respect to an object of the update instruction put on standby either until the object of the update instruction put on standby becomes a processing object, or when the object of the update instruction put on standby has become a processing object.

According to the present invention, a speed of processing for applying a transaction log to a database can be increased.

BRIEF DESCRIPTION OF THE DRAWINGS

FIG. 6 illustrates a transaction log that is acquired in an information processing device according to an embodiment;

DESCRIPTION OF EMBODIMENTS

An embodiment (hereinafter, also referred to as the "present embodiment") according to an aspect of the present invention will be described below with reference to the drawings. However, it should be noted that the present embodiment described below merely exemplifies the present invention in all respects and is not intended to limit the present invention thereto. It is obvious that various improvements and modifications may be made to the present invention without departing from the spirit and scope thereof. In other words, when implementing the present invention, specific configurations in accordance with respective embodiments may be adopted as appropriate.

Moreover, while data that appears in the present embodiment is described using a natural language, more specifically, data is specified in a quasi-language, commands, parameters, a machine language, or the like that can be recognized by a computer.

§ 1 First Embodiment

Configuration Example

Figure 3:
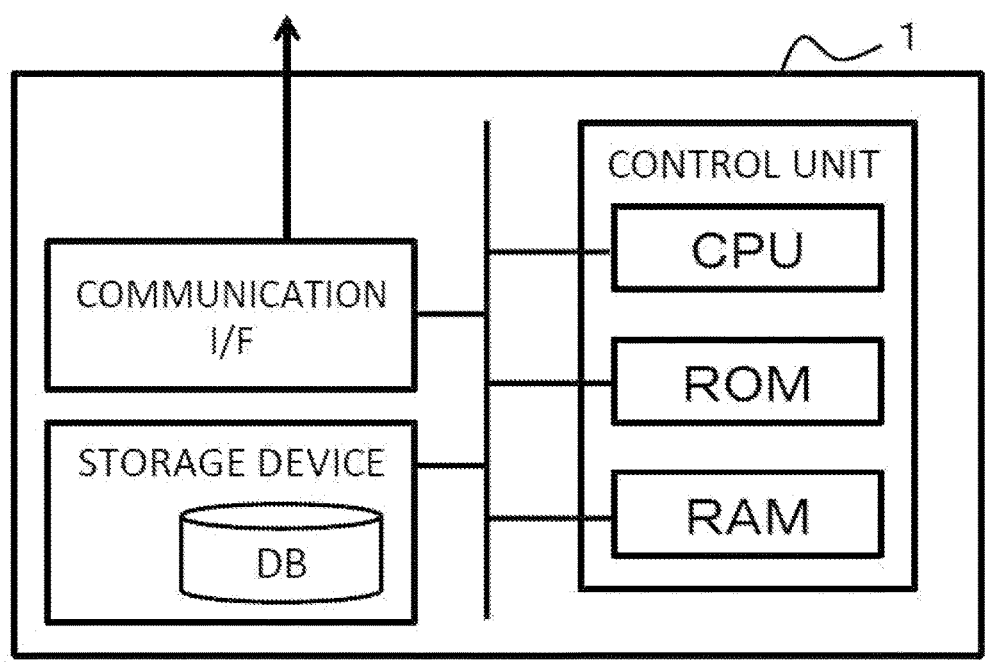
FIG. 3 illustrates an information processing device according to an embodiment.

FIG. 3 illustrates a hardware configuration of an information processing device 1 according to the present embodiment. As illustrated in FIG. 3, the information processing device 1 according to the present embodiment is a computer to which a control unit, a storage device, and a communication interface that enables communication via a network are electrically connected. The control unit includes a central processing unit (CPU), a random access memory (RAM), a read only memory (ROM), and the like. In addition, the storage device stores programs and the like that are executed by the control unit and also stores a database ("DB" in FIG. 3).

Moreover, the communication interface is described as "communication I/F" in FIG. 3. The RAM and the ROM included in the control unit may be referred to as a main storage device and the storage device may be referred to as an auxiliary storage device. The CPU included in the control unit may be referred to as a processing unit. The information processing device 1 may be a personal computer (PC), a server machine, and the like.

In addition, components may be omitted, replaced, and added in the hardware configuration of the information processing device 1 as appropriate in accordance with embodiments. For example, the control unit may include a plurality of processors.

Figure 4:
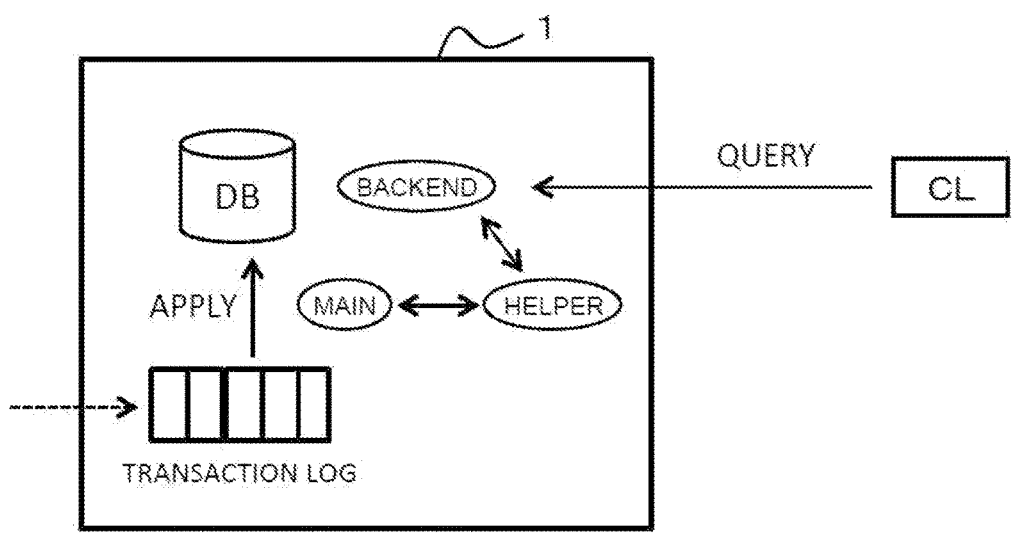
FIG. 4 illustrates relationships among respective processes that are executed in an information processing device according to an embodiment.

FIG. 4 illustrates relationships among respective processes executed in the information processing device 1. The information processing device 1 is a computer which acquires a transaction log and which updates a database stored in its own storage device using the acquired transaction log. The information processing device 1 sequentially refers to records in the acquired transaction log from the first record and applies the records to its database. In doing so, the information processing device 1 executes update instructions with respect to data (tuples) read to the RAM and skips update instructions with respect to data that is not read to the RAM. The skipped update instructions are executed either until data to become an object is read to the RAM or upon the data to become an object being read to the RAM. Accordingly, update of the database using the transaction log is completed.

As illustrated in FIG. 4, by developing a program or the like stored in the storage device to the RAM or the like and interpreting contents of the developed program, the control unit of the information processing device 1 according to the present embodiment executes a main process ("MAIN" in FIG. 4), a back-end process ("BACKEND" in FIG. 4), and a helper process ("HELPER" in FIG. 4).

The main process is a process which sequentially refers to records in an acquired transaction log from the first record and applies the records to its database. A transaction log includes records related to update instructions for updating data included in a database and records related to management of transactions. The main process processes records related to an update instruction for updating data included in the database among records included in the transaction log by executing the update instruction when an object of the update instruction is read onto the RAM and putting execution of the update instruction on standby when an object of the update instruction is not read onto the RAM. The update instruction put on standby is processed by the helper process or the back-end process to complete update of the database using the transaction log.

The helper process is an auxiliary process of the main process and the back-end process (to be described later). In the present embodiment, the helper process executes update instructions put on standby by the main process.

The back-end process is a process that executes a retrieval process in response to a retrieval request (query) with respect to the database from a client PC ("CL" in FIG. 4). In the present embodiment, update instructions put on standby by the main process may be executed not only by the helper process but also by the back-end process. Moreover, the back-end process according to the present embodiment puts execution of the retrieval process on standby until processing on a record of the transaction log that is required to be processed in relation to the retrieval process is completed. However, the back-end process may execute processes other than a retrieval process. Processes executed by the back-end process are not limited to a retrieval process.

Moreover, a transaction log that is used to update a database in the present embodiment may be a transaction log created by the computer itself in order to perform a recovery of its own database. In this case, the information processing device 1 acquires the transaction log from the storage device of its own computer or another computer.

Alternatively, the transaction log that is used to update a database in the present embodiment may be a transaction log created by another computer in order to perform replication between a database of the other computer and the database of the computer of the information processing device 1. In this case, the information processing device 1 acquires the transaction log from the other computer.

Furthermore, the transaction log used to update a database in the present embodiment may be a transaction log created in series or a transaction log created in parallel. However, in order to keep techniques related to transaction logs unchanged from conventional systems, the transaction logs that are used in the present embodiment are desirably created in series.

The present embodiment can be widely applied to systems that update databases using transaction logs.

Operation Example

Figure 5:
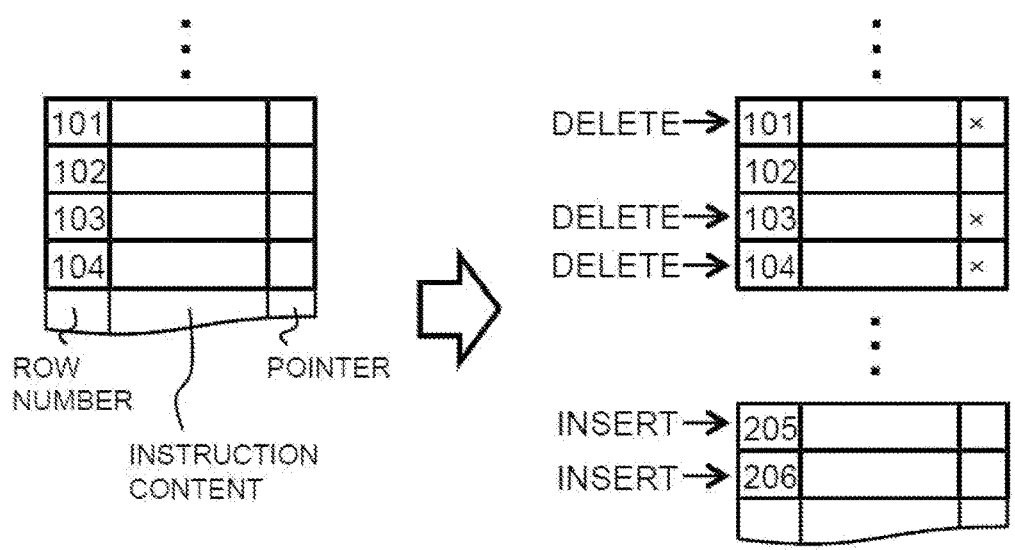
FIG. 5 shows an example of an update of a database according to an embodiment.

Next, a specific operation example of the information processing device 1 will be described. FIG. 5 shows an example of an update of a database according to the present operation example. In addition, FIG. 6 illustrates a transaction log acquired in the present operation example.

FIG. 5 illustrates a scene where a part of a table-format database including a row number, an instruction content, and a pointer is updated. Specifically, FIG. 5 illustrates a scene where tuples of row numbers 101, 103, and 104 are deleted (DELETE) and tuples of row numbers 205 and 206 are inserted (INSERT). However, a format of the database is not limited to a table format and may be selected as appropriate in accordance with embodiments.

Moreover, as will be shown in FIG. 7 and the like (to be described later), in the present embodiment, each tuple in the database is managed in page units on the storage device and exchange of data between the storage device and the RAM is performed in page units. In other words, when updating contents of the database, the control unit reads a page including a tuple that is an update object from the storage device to the RAM and updates the object tuple. In addition, after updating the object tuple, the control unit saves the update of the database by writing the page including the tuple from the RAM to the storage device. Moreover, a timing where a page is written from the RAM to the storage device is decided as appropriate in accordance with embodiments. In addition, each page stores one or a plurality of tuples. A page may also be referred to as a block and corresponds to a "predetermined set" according to the present invention.

FIG. 6 illustrates a transaction log created in series when the update to the database shown in FIG. 5 occurs. The transaction log chronologically and continuously records at least instruction contents and objects of the instructions.

The transaction log illustrated in FIG. 6 shows that a first transaction is started (XB1), a tuple with a row number 101 that is stored in a page with a page number 5 is deleted by the first transaction (D1_101_5), a second transaction is started (XB2), a tuple with a row number 205 is inserted to a page with a page number 2 by the second transaction (I2_205_2), a tuple with a row number 103 that is stored in the page with the page number 2 is deleted by the first transaction (D1_103_2), the first transaction is committed (XC1), a tuple with a row number 104 that is stored in a page with the page number 9 is deleted by the second transaction (D2_104_9), a tuple with a row number 206 is inserted to a page with a page number 8 by the second transaction (I2_206_8), and the second transaction is committed (XC2).

In this case, records of the transaction log illustrated in FIG. 6 can be divided into records related to update instructions for updating data included in the database (D1_101_5, D1_103_2, I2_205_2, D2_104_9, and I2_206_8) and records related to management of the transactions (XB1, XB2, XC1, and XC2). In addition, the transaction log illustrated in FIG. 6 is provided with a number (LSN: log sequence number) for identifying each record.

<Main Process>

Figure 7:
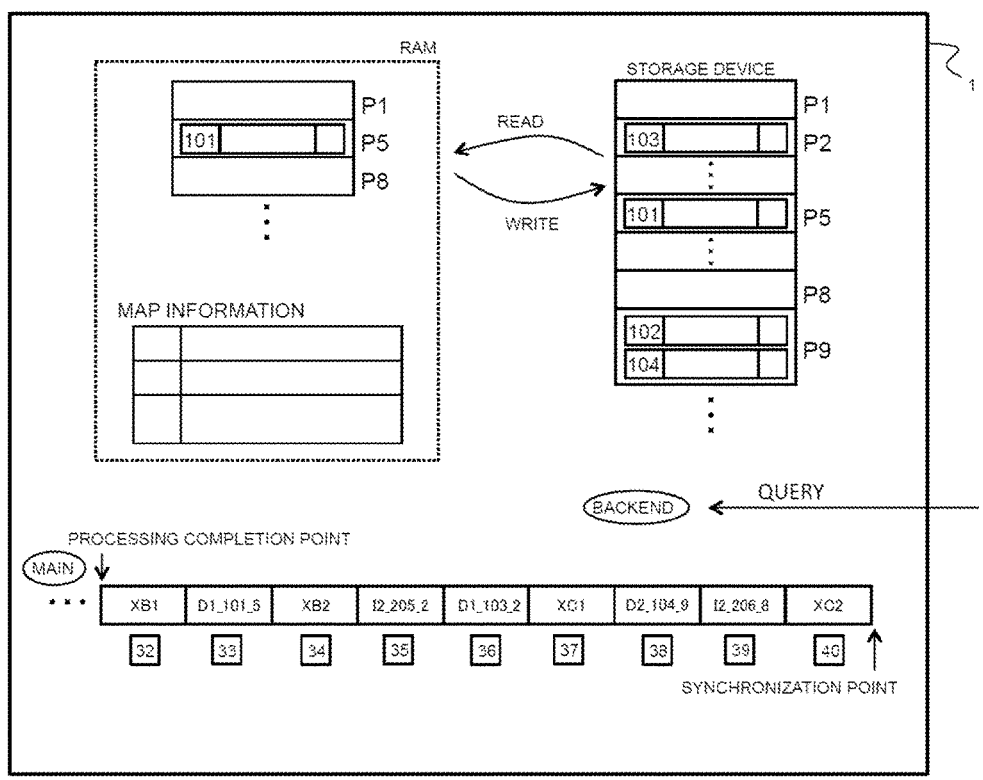
FIG. 7 illustrates an operational state of an information processing device according to an embodiment at a point when a query is received.
Figure 8:
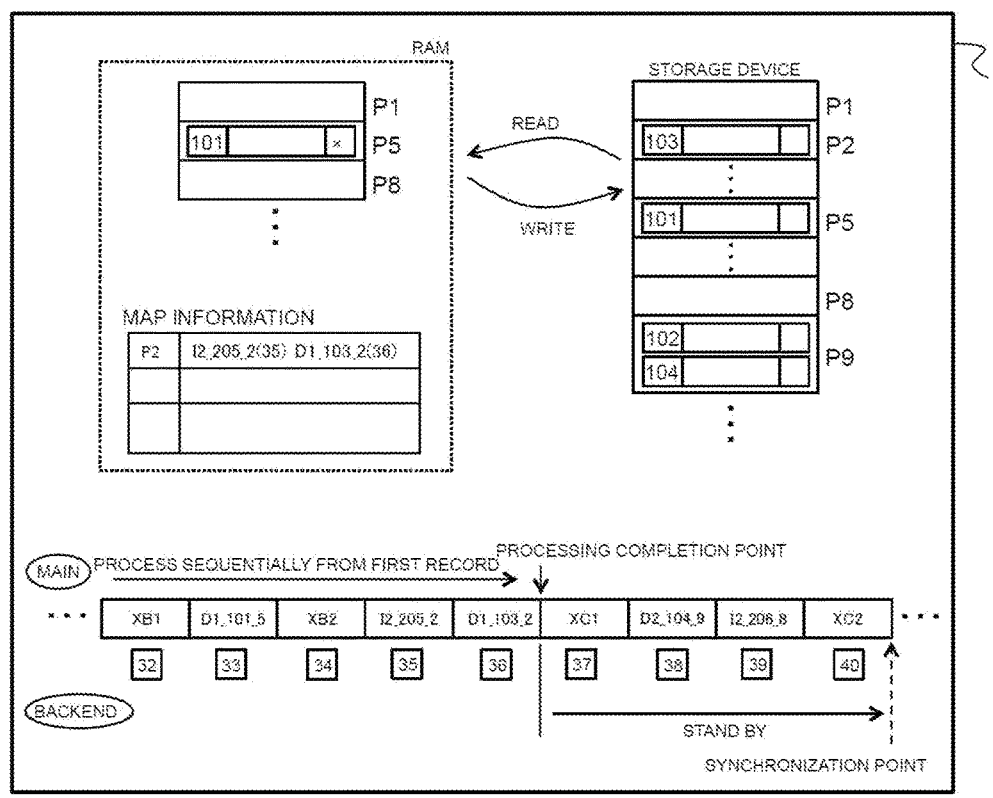
FIG. 8 illustrates an operational state of an information processing device according to an embodiment at a point when processing of a main process according to the embodiment is completed up to a 36th record.
Figure 9:
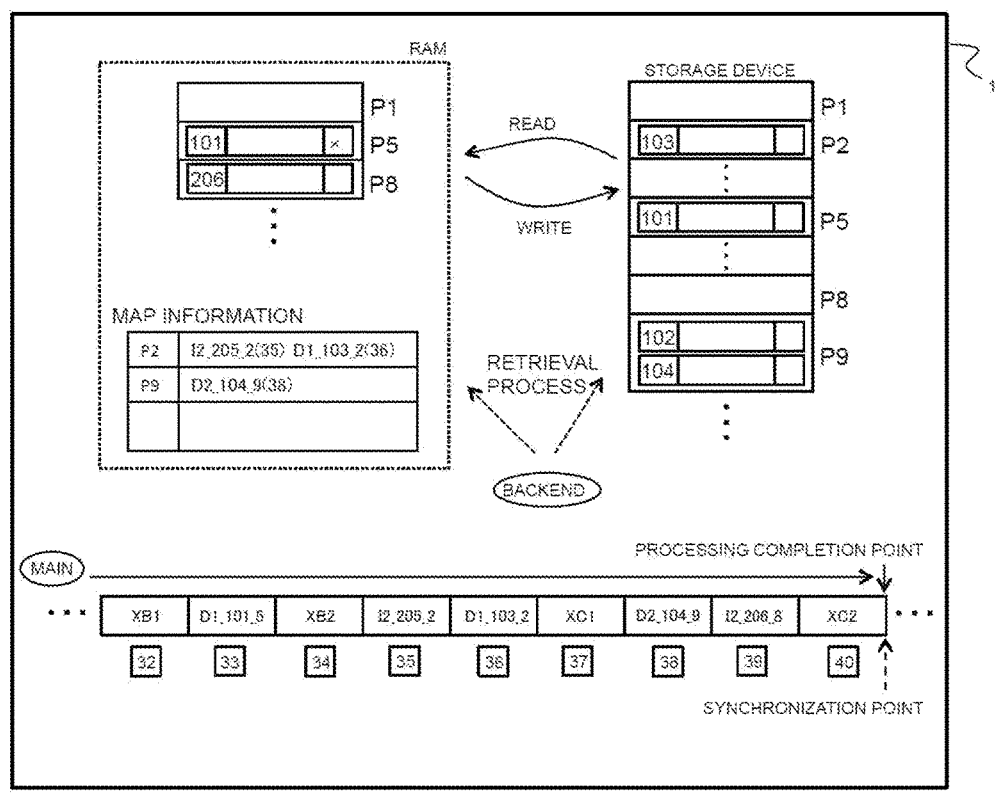
FIG. 9 illustrates an operational state of an information processing device according to an embodiment at a point when processing of a main process according to the embodiment is completed up to a record with a synchronization point.

FIGS. 7 to 9 illustrate operations of the main process.

FIG. 7 illustrates an operational state of the information processing device 1 at a point when a query is received. In FIG. 7, the tuple with the row number 103 is stored in the page with the page number 2 (P2), the tuple with the row number 101 is stored in the page with the page number 5 (P5), and the tuples with the row numbers 102 and 104 are stored in the page with the page number 9 (P9). In addition, pages with the page numbers 1, 5, and 8 (P1, P5, and P8) are read onto the RAM.

In addition, in the scene illustrated in FIG. 7, the transaction log is acquired up to a 40th record and processing of the main process is completed up to a record preceding a 32nd record. Furthermore, the back-end process has been started in response to a query from the client PC.

The main process sequentially refers to the records in the acquired transaction log from the first record. In addition, when the referred record is a record related to an update instruction of the database, with respect to an update instruction (for example, a DELETE instruction) for which an object (tuple) thereof exists in the database at the point when the record is referred to, the main process determines whether or not the object (tuple) of the update instruction has been read onto the RAM. On the other hand, with respect to an update instruction (for example, an INSERT instruction) for which an object (tuple) thereof does not exist in the database at the point when the record is referred to, the main process determines whether or not the object (tuple) of the update instruction has been read onto the RAM by determining whether or not a region in which the object (tuple) of the update instruction is inserted has been read onto the RAM. Moreover, in the present embodiment, since tuples are managed in page units, the main process determines whether or not a page including a tuple that is an object of an update instruction represented by a record has been read onto the RAM.

When an object page has been read onto the RAM, the main process executes the update instruction represented by the object record. On the other hand, when an object page has not been read onto the RAM, the main process puts execution of the update instruction represented by the object record on standby.

In addition, when the referred record is a record related to management of transactions, the main process updates management information for managing transactions in accordance with contents represented by the record. For example, management information indicates a transaction being executed or a committed transaction.

Moreover, when putting execution of an update instruction represented by a referred record on standby, the main process creates map information which records contents of the update instruction put on standby in association with a tuple of concern. At least one of contents of the update instruction put on standby and a number of the record is recorded in map information in association with a tuple that is an object of the update instruction. The helper process or the back-end process executes the update instruction put on standby by referring to the map information.

In this case, the transaction log that records contents of instructions is stored in the RAM or the storage device of the information processing device 1. Therefore, when a record number of the transaction log is recorded in the map information, the helper process or the back-end process accesses the transaction log stored in the RAM or the storage device based on the record number that is recorded in the map information and identifies contents of the update instruction to be executed.

In addition, in the present embodiment, a tuple that is an object of an update instruction is managed in page units. Therefore, at least one of contents of the update instruction and a number of a record of the transaction log is recorded in map information in association with a page (specifically, a page number) including the tuple that is an object of the update instruction. In the present embodiment, an example where contents of an update instruction or a record number are recorded in association with a page number is shown.

Moreover, it is assumed that nothing is recorded in map information at the point shown in FIG. 7.

Figure 1:
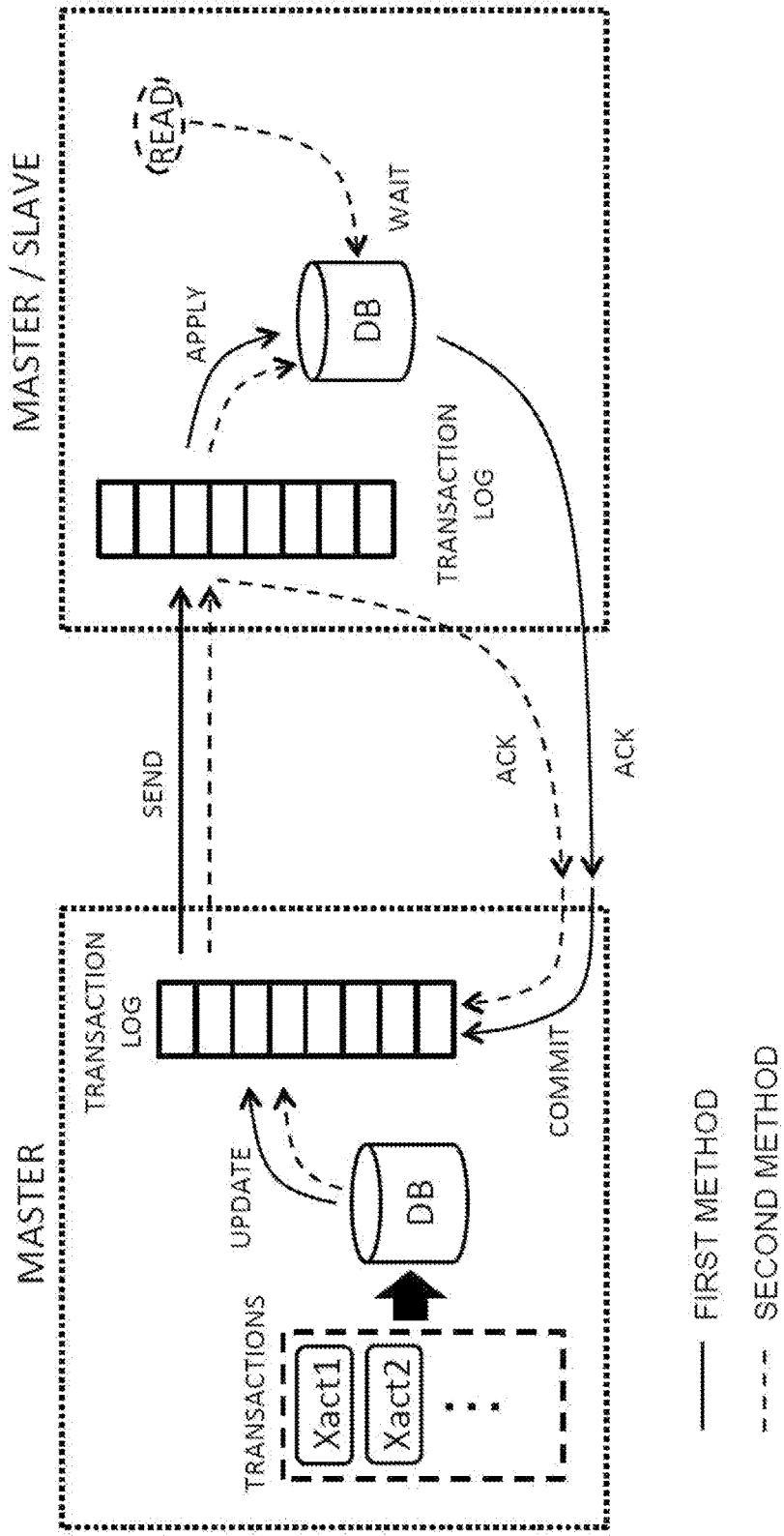
FIG. 1 illustrates a conventional method of performing replication by synchronizing another master or a slave with a master.

In the present embodiment, a scene is assumed where, as in the second method illustrated in FIG. 1, the information processing device 1 returns an ACK and replication is performed by synchronizing the information processing device 1 and another computer with each other regardless of whether or not a transaction log is applied. Therefore, a synchronization point is set in the transaction log shown in FIG. 7. The synchronization point indicates a record that is required to be processed in relation to a retrieval process implemented on the database of the information processing device 1. The back-end process puts execution of the retrieval process on standby until processing by the main process reaches the synchronization point that is set at the point when the query is received or, in the case of the present operation example, until processing by the main process is completed up to the 40th record.

Information indicating a processing completion point and information indicating a synchronization point are stored in, for example, the RAM. In addition, for example, the processing completion point is updated so as to indicate a record of which processing is completed each time the main process completes processing. Furthermore, for example, the synchronization point is updated so as to indicate a record for which an ACK representing reception of the transaction log is returned each time an ACK is returned.

Moreover, a method of synchronous replication that is applied to the present embodiment is not limited to the second method illustrated in FIG. 1. For example, a method in which the information processing device 1 returns an ACK after a transaction log is applied to the database as in the case of the first method illustrated in FIG. 1 may be applied to the present embodiment. In addition, a method of replication that is executed by the information processing device 1 is not limited to synchronous replication and may instead be asynchronous replication. In this case, since a synchronization point is not set, an operation of putting a retrieval process on standby up to a synchronization point among operations of the back-end process according to the present embodiment is no longer necessary.

FIG. 8 illustrates an operational state of the information processing device 1 at a point when processing of the main process has been completed up to a 36th record following the state illustrated in FIG. 7.

Among 32nd to 36th records, the 33rd, 35th, and 36th records are records related to update instructions of the database. In addition, the 32nd and 34th records are records related to management of transactions and are related to instructions other than update instructions.

In this case, among the 33rd, 35th, and 36th records that are related to update instructions of the database, an object of the update instruction represented by the 33rd record is the tuple with the row number 101 that is stored in page P5. In addition, the page P5 that includes the tuple with the row number 101 has been read onto the RAM. On the other hand, an object of the update instruction represented by the 35th record is the tuple with the row number 205 to be inserted to the page P2. The page P2 that represents a region in which the tuple with the row number 205 is to be inserted has not been read onto the RAM. In addition, an object of the update instruction represented by the 36th record is the tuple with the row number 103 that is stored in the page P2. The page P2 that includes the tuple with the row number 103 has not been read onto the RAM in a similar manner to the 35th record.

Therefore, the main process first refers to the 32nd record and executes an instruction represented by the 32nd record. Specifically, the 32nd record represents a start of a 1st transaction. In consideration thereof, for example, the main process updates management information so as to indicate that the execution of the 1st transaction is in progress.

After processing the 32nd record, the main process refers to the next 33rd record. Since an object of the update instruction (D1_101_5) represented by the 33rd record has been read onto the RAM, the main process executes the update instruction (D1_101_5) represented by the 33rd record. Specifically, the main process adds a deletion pointer to the tuple with the row number 101 on P5 that has been read onto the RAM.

After processing the 33rd record, the main process refers to the next 34th record and executes the instruction represented by the 34th record. Specifically, the 34th record represents a start of a 2nd transaction. In consideration thereof, for example, the main process updates management information so as to indicate that the execution of the 2nd transaction is in progress.

After processing the 34th record, the main process refers to the next 35th record. Since an object of the update instruction (I2_205_2) represented by the 35th record has not been read onto the RAM, the main process puts execution of the update instruction (I2_205_2) represented by the 35th record on standby. In addition, the main process records contents of the update instruction (I2_205_2) represented by the 35th record or a record number (35) in map information in association with the page number (P2).

After processing the 35th record, the main process refers to the next 36th record. An object of the update instruction (D1_103_2) represented by the 36th record has not been read onto the RAM in a similar manner to the 35th record. Therefore, the main process also puts execution of the update instruction (D1_103_2) represented by the 36th record on standby. In addition, the main process records contents of the update instruction (D1_103_2) represented by the 36th record or a record number (36) in map information in association with the page number (P2). Accordingly, processing of records up to the 36th record is completed.

Moreover, the main process records contents of update instructions or record numbers in map information in an order in which the records had been referred. Accordingly, the helper process or the back-end process (to be described later) is able to recognize an order of execution of update instructions put on standby. However, even if contents of update instructions or record numbers are not recorded in map information in an order in which the records had been referred, the helper process or the back-end process can recognize an order of execution of update instructions based on record numbers of the update instructions put on standby.

Moreover, execution by the back-end process is put on standby because processing by the main process has not been completed up to the 40th record that is a synchronization point set at the point when a query is received.

FIG. 9 illustrates an operational state of the information processing device 1 at a point when processing of the main process has been completed up to the synchronization point (40th record) set at the point shown in FIG. 7 following the state illustrated in FIG. 8.

Among 37th to 40th records, the 38th and 39th records are records related to update instructions of the database. In addition, the 37th and 40th records are records related to management of transactions and are related to instructions other than update instructions.

In this case, among the 38th and 39th records that are related to update instructions of the database, an object of the update instruction represented by the 38th record is the tuple with the row number 104 that is stored in page P9. In addition, the page P9 that includes the tuple with the row number 104 has not been read onto the RAM. On the other hand, an object of the update instruction represented by the 39th record is the tuple with the row number 206 to be inserted to the page P8. The page P8 that represents a region in which the tuple with the row number 206 is to be inserted has been read onto the RAM.

Therefore, the main process first refers to the 37th record and executes an instruction represented by the 37th record. Specifically, the 37th record represents a commit of a 1st transaction. In consideration thereof, for example, the main process updates management information so as to indicate that the 1st transaction has been committed.

After processing the 37th record, the main process refers to the next 38th record. Since an object of the update instruction (D2_104_9) represented by the 38th record has not been read onto the RAM, the main process puts execution of the update instruction (D2_104_9) represented by the 38th record on standby. In addition, the main process records contents of the update instruction (D2_104_9) represented by the 38th record or a record number (38) in map information in association with the page number (P9).

After processing the 38th record, the main process refers to the next 39th record. Since an object of the update instruction (I2_206_8) represented by the 39th record has been read onto the RAM, the main process executes the update instruction (I2_206_8) represented by the 39th record. Specifically, the main process inserts the tuple with the row number 206 on P8 that has been read onto the RAM.

After processing the 39th record, the main process refers to the next 40th record and executes the instruction represented by the 40th record. Specifically, the 40th record represents a commit of the 2nd transaction. In consideration thereof, for example, the main process updates management information so as to indicate that the 2nd transaction has been committed.

Accordingly, since processing by the main process is completed up to the 40th record that is a synchronization point set at the point when the query is received, the back-end process is now able to execute the retrieval process on the object query.

<Helper Process>

The update instruction put on standby by the main process is processed by the helper process as described below.

Figure 10:
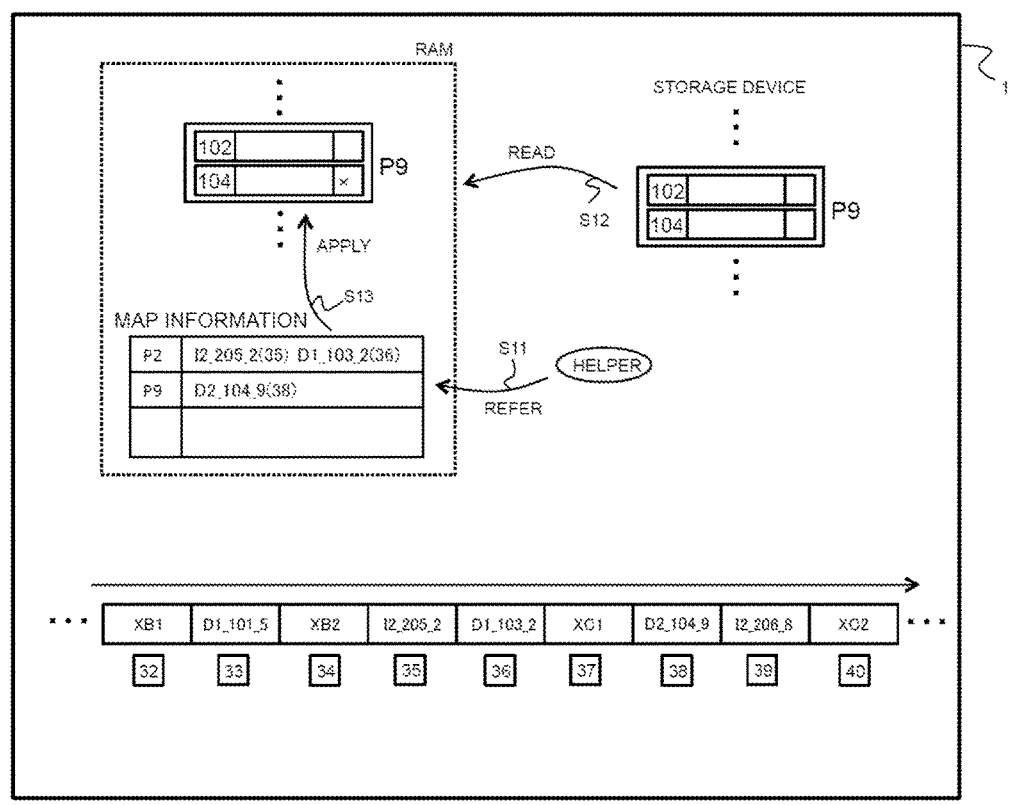
FIG. 10 illustrates a processing procedure of a helper process according to an embodiment.

FIG. 10 illustrates a processing procedure of the helper process according to the present embodiment. Moreover, FIG. 10 illustrates a scene where processing by the helper process is started before a retrieval process by the back-end process shown in FIG. 9 is started.

In step S11, the helper process refers to map information and determines whether or not there is an update instruction put on standby. When an update instruction put on standby is not recorded in the map information, the helper process ends processing. On the other hand, when an update instruction put on standby is recorded in the map information, the helper process selects an object to be processed by the helper process in accordance with management units and advances processing to step S12. In the example shown in FIG. 10, an update instruction put on standby is managed in page units and the helper process has selected page P9 as an object to be processed by the helper process.

In step S12, the helper process reads out the object to be processed by the helper process from the storage device to the RAM. In the present operation example, since page P9 is selected as the processing object of the helper process, page P9 is read out from the storage device to the RAM.

In step S13, the helper process executes the update instruction which is associated with the processing object selected by the helper process and which is put on standby. In the present operation example, the helper process executes the update instruction (D2_104_9) which is put on standby with respect to page P9 and adds a deletion point to the tuple with the row number 104. In addition, after executing the update instruction which is put on standby with respect to the processing object (P9) selected by the helper process, the helper process deletes a record related to the processed update instruction from the map information and ends processing.

Moreover, as described earlier, when a plurality of update instructions are put on standby with respect to the page selected as the processing object, the helper process executes the update instructions put on standby in an order in which the update instructions are recorded in the map information (in an order of numbers). Accordingly, consistency of databases when replication is being executed can be maintained with respect to the page between the information processing device 1 and a computer that is a replication source.

Moreover, the control unit of the information processing device 1 can execute the helper process in plurality or may increase or reduce the number of helper processes in operation by generating or deleting, or starting or stopping, helper processes. For example, the control unit may increase or reduce the number of helper processes to be started in accordance with management units of update instructions which are recorded in the map information and which are put on standby. In the present operation example, the control unit may increase or reduce the number of helper processes to be started in accordance with the number of pages for which an update instruction put on standby is recorded in the map information. In this case, since processing capacity of the helper process can be made variable in accordance with a request and the presence of unnecessary helper processes can be avoided, resources can be utilized in an efficient manner.

In addition, for example, a certain number of helper processes may be started up in advance. In this case, depending on a state of processing, there is a risk that an unnecessary helper process exists. On the other hand, since a helper process need not be started once a request for processing occurs, the occurred request can be accommodated in a swift manner.

Moreover, the helper process may execute processing as appropriate in accordance with embodiments at timings other than those shown in the present operation example. In consideration of a state of map information, for example, the helper process can execute the operation illustrated in FIG. 10 after processing of the main process on the 38th record is completed.

<Back-End Process>

Figure 11:
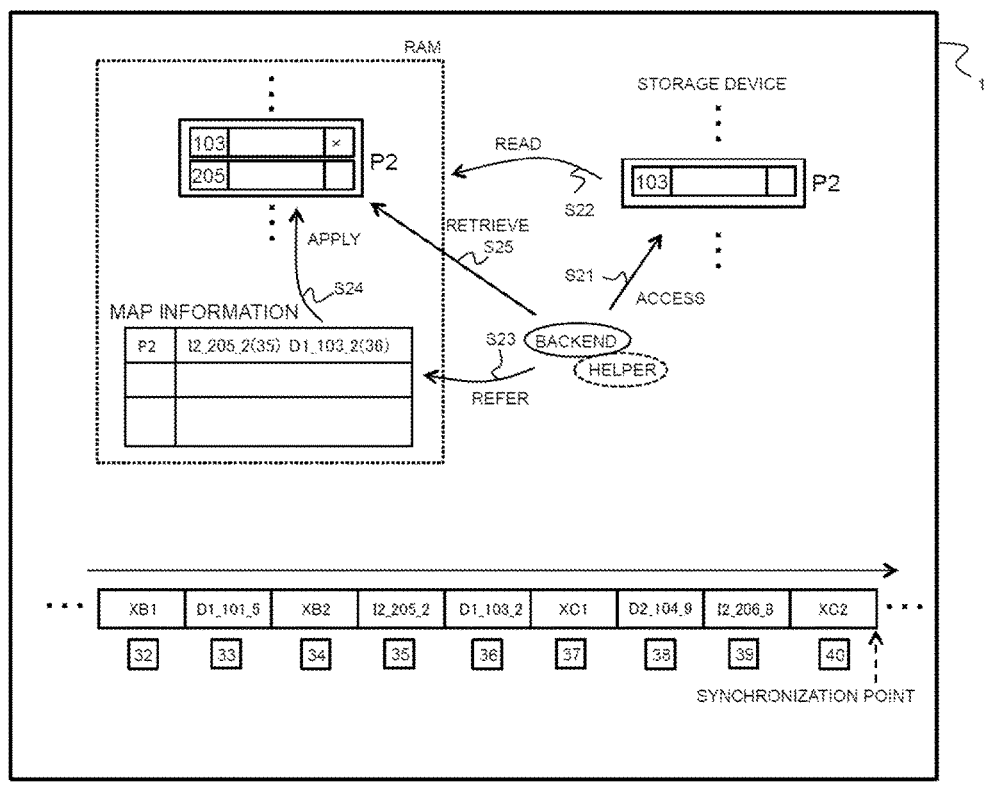
FIG. 11 illustrates a processing procedure of a back-end process according to an embodiment.

FIG. 11 illustrates a processing procedure of the back-end process according to the present embodiment. Moreover, FIG. 11 illustrates a scene where a retrieval process by the back-end process is started following the states illustrated in FIGS. 9 and 10.

In step S21, in order to extract a tuple that conforms to contents of the received query, the back-end process accesses a region specified as a retrieval range by the query among a storage region of the storage device. In addition, in step S22, when a page included in the accessed region does not exist on the RAM, the back-end process reads the page from the storage device to the RAM and sets the page as an object of a retrieval process. For example, when a plurality of tables are included in the database, a specific table may be specified as the retrieval range. In this case, the back-end process accesses a region storing data related to the table specified as the retrieval range, and when data of the table to be the retrieval range does not exist on the RAM, the back-end process reads the data from the storage device to the RAM. The region read out from the storage device to the RAM, the retrieval range specified by the query, and the like may be decided as appropriate in accordance with embodiments. Once the page included in the accessed region is read to the RAM, the back-end process advances processing to step S23.

Moreover, when reading out pages included in the retrieval range, for example, the back-end process may read out object pages one page at a time or may read out a plurality of pages at the same time. In this case, each time one or a plurality of pages are read out, the back-end process executes the processing described later with respect to the one or the plurality of read pages. FIG. 11 illustrates a scene where page P2 is read from the storage device to the RAM by the processing of step S22.

When the page included in the region accessed by the back-end process already exists on the RAM, the back-end process does not perform reading from the storage region and sets the page already existing on the RAM as an object of a retrieval process, and advances processing to step S25 instead of step S23.

In step S23, the back-end process refers to map information and determines whether or not there is an update instruction put on standby with respect to the page read to the RAM. When an update instruction put on standby with respect to the page read to the RAM is not recorded in the map information, the back-end process advances processing to step S25. On the other hand, when an update instruction put on standby with respect to the page read to the RAM is recorded in the map information, the processing is advanced to step S24. In the present operation example, since page P2 is read to the RAM in step S22 and update instructions (I2_205_2 and D1_103_2) put on standby with respect to tuples stored in page P2 exist, the processing is advanced to step S24.

In step S24, the back-end process executes an update instruction put on standby with respect to the page read to the RAM. In the present operation example, the back-end process executes update instructions (I2_205_2 and D1_103_2) put on standby with respect to P2. In this case, the back-end process executes update instructions put on standby in an order in which the update instructions are recorded in the map information. In other words, in the present operation example, the back-end process first inserts the tuple with the row number 205 in P2 and subsequently adds a deletion pointer to the tuple with the row number 103. In addition, after executing all of the update instructions put on standby with respect to the page (P2) read to the RAM, the back-end process deletes records related to the processed update instructions from the map information.

Moreover, in a similar manner to the helper process, when a plurality of update instructions are put on standby with respect to the page selected as the processing object, the back-end process executes the update instructions put on standby in an order in which the update instructions are recorded in the map information (in an order of numbers). Accordingly, consistency of databases when replication is being executed can be maintained with respect to the page between the information processing device 1 and a computer that is a replication source.

In step S25, the back-end process executes a retrieval process in accordance with the received query with respect to the page that is the object of the retrieval process. In addition, when pages not set as objects of the retrieval process remain in the retrieval range, the back-end process returns to step S22 and repeats processing. On the other hand, when pages not set as objects of the retrieval process do not remain in the retrieval range, the back-end process sends back a result of the retrieval process to the client PC as a response to the query and ends processing.

In the present embodiment, an update instruction put on standby is executed with respect to a page at the point when the page is read to the RAM. In addition, an update instruction with respect to a page existing on the RAM is executed at once. Therefore, in the present embodiment, when a page included in the retrieval range is already read to the RAM, execution of an update instruction with respect to the page is not put on standby. Accordingly, when a page to be read out in step S22 already exists on the RAM, the back-end process according to the present embodiment may not perform a read from the storage region and may set the page already existing on the RAM as an object of a retrieval process, omit processing of steps S23 and S24, and advance processing to step S25.

Moreover, the control unit of the information processing device 1 can execute the back-end process in plurality or may increase or reduce the number of back-end processes in operation by generating or deleting, or starting or stopping, back-end processes. For example, the control unit may increase or reduce the number of back-end processes to be started in accordance with the number of queries received from the client PC. In this case, since a processing capacity of the back-end process can be made variable in accordance with a request and the presence of unnecessary back-end processes can be avoided, resources can be utilized in an efficient manner.

In addition, the back-end process may relegate processing related to at least updating of pages in steps S23 and S24 to the helper process. In this case, for example, the back-end process causes the helper process to execute the processing of steps S23 and S24 by requesting the helper process to update pages after accessing the storage device. In addition, the back-end process executes the retrieval process of step S25 upon receiving a notification from the helper process after the processing of step S24 is completed. By having the back-end process relegate page updating processes to the helper process in this manner, page updating processes can be centralized to the helper process. Accordingly, a division of roles among the respective processes can be clarified and structures of the respective processes can be simplified.

<Working Effect of the First Embodiment>

When a page (tuple) becomes an object of processing in a retrieval process by the back-end process or the like, the page (tuple) is read to the RAM. A page (tuple) that is already read to the RAM may become an object of processing at any time. On the other hand, a page (tuple) that has not been read to the RAM does not become an object of processing unless the page (tuple) is read to the RAM.

In consideration thereof, the main process immediately executes an update instruction with respect to a page which is already read to the RAM and which may become an object of processing at any time at a point when the main process refers to an object record. On the other hand, in the case of an update instruction with respect to a page which does not exist on the RAM and which does not become an object of processing at a point when the main process refers to an object record, the main process puts execution of the update instruction on standby.

In addition, an update instruction put on standby by the main process is executed by an operation of the helper process or the back-end process as described above either until the object of the update instruction is read onto the RAM and becomes a processing object or upon the update instruction being read onto the RAM and becoming a processing object.

When focusing on the tuple with the row number 205, an update instruction to insert the tuple is an update instruction represented by a record preceding a synchronization point related to a retrieval process in accordance with a received query. At a point of step S21 when the back-end process starts an operation related to the retrieval process, the update instruction is on standby and has not been executed. However, at a point of step S25 when the retrieval process is executed, the update instruction has already been executed by the back-end process (or the helper process). Therefore, the tuple with the row number 205 becomes an object of the retrieval process without incident.

In other words, in the present embodiment, the main process sequentially refers to records in an transaction log from the first record, immediately executes an update instruction with respect to a page that may become a processing object at a point when the main process refers to an object record, and puts execution of an update instruction with respect to a page that does not become a processing object at a point when the main process refers to an object record on standby. In addition, the update instruction put on standby is executed by the helper process or the back-end process before a request is issued to execute the update instruction.

The update instruction put on standby is an instruction whose object is a page that requires accessing the storage device. In this case, a speed of accessing the storage device is significantly slower than a speed of accessing the RAM. Therefore, a speed of an updating process of a database decreases as the number of times the storage device is accessed increases. In the processing by the main process according to the present embodiment, a transaction log can be processed without executing an update instruction that requires such accessing of the storage device. Therefore, processing of the main process can be executed at a significantly high speed without accessing the storage device. As a result, according to the present embodiment, a transaction log up to a synchronization point can be processed at high speed and a standby time for retrieval by the back-end process can be reduced significantly.

In addition, the update instruction put on standby is executed by the helper process or the back-end process before a request is issued to execute the update instruction. Therefore, in the retrieval by the back-end process, even if there is an update instruction put on standby, update by the update instruction up to a record number for which synchronization has been completed can be referred with respect to an object of a retrieval process even when there is an update instruction put on standby. Therefore, even when a replication is being executed, the back-end process can perform retrieval in a state where consistency between databases has been secured.

Figure 2:
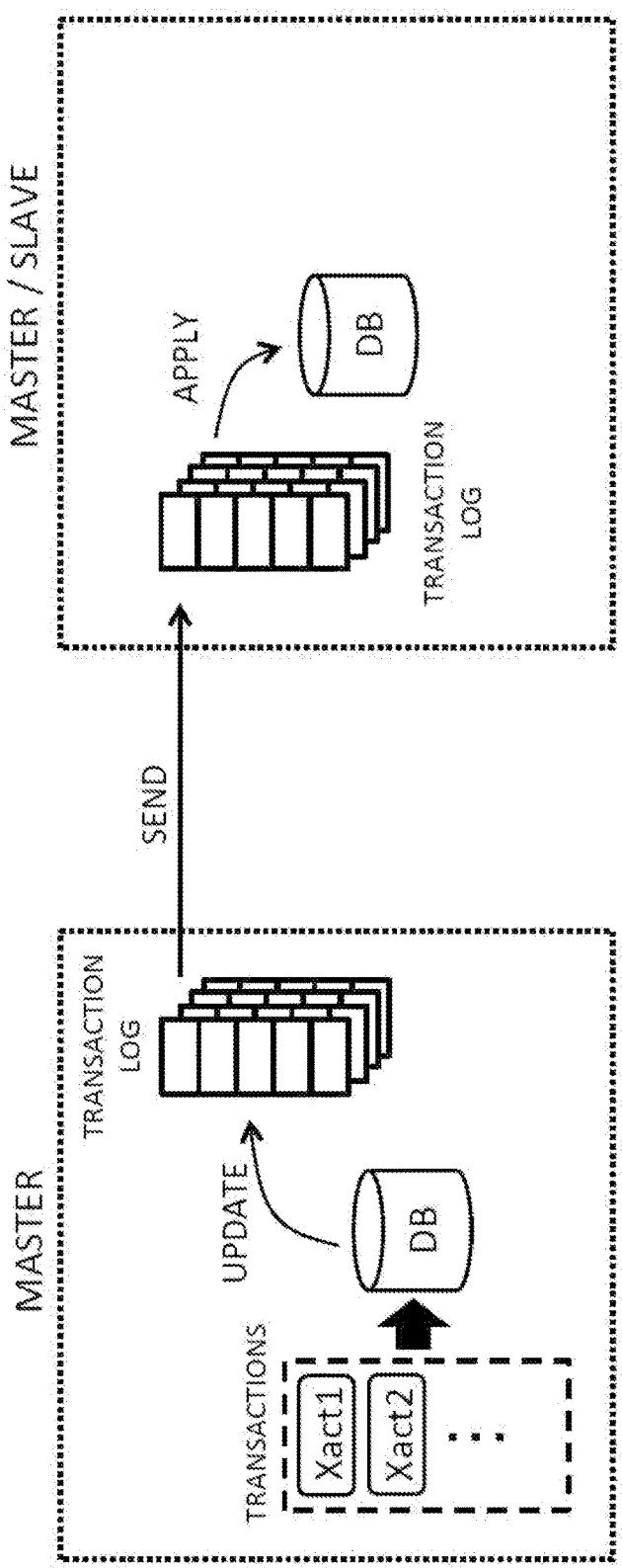
FIG. 2 illustrates a conventional method of performing replication by synchronizing another master or a slave with a master.

In addition, conventionally, performing retrieval while maintaining consistency between databases requires executing all update instructions represented in a transaction log up to a synchronization point even when parallel processing is enabled such as the case of the third method shown in FIG. 2 described above. In contrast, according to the present embodiment, a retrieval process can be executed while keeping update instructions that are not related to the retrieval process on standby among the update instructions put on standby. In other words, according to the present embodiment, among update instructions represented by records of a transaction log, an update instruction whose execution is requested can be preferentially executed and execution of an update instruction whose execution is not requested can be skipped (postponed). Even in this regard, according to the present embodiment, a standby time for retrieval can be reduced.

Therefore, according to the present embodiment, for the reasons given above, a standby time for retrieval can be reduced while securing consistency between databases in a retrieval process.

In addition, in the present embodiment, since an object update instruction need only be executed when accessing is required, reading of unnecessary data from the storage device to the RAM can be suppressed. Furthermore, in the present embodiment, by a single reading of a page, a plurality of update instructions with respect to the page can be executed. Therefore, according to the present embodiment, efficiency of exchange between the storage device and the RAM when updating a database can be improved.

Moreover, when executing a plurality of update instructions with respect to the page, the helper process or the back-end process executes the update instructions in an original order in which the transaction log represents the update instructions. Therefore, efficiency of exchange between the storage device and the RAM can be improved while maintaining consistency between databases.

In addition, the information processing device 1 according to the present embodiment uses map information to manage update instructions that have been skipped by the main process in page units. Since an updating process of the database is performed per page, execution of the update instructions that have been skipped by the main process can be processed in page units and in parallel by processes that differ from each other.

Furthermore, the information processing device 1 according to the present embodiment can increase or reduce a degree of processing to be performed in parallel or, in other words, the number of helper processes or back-end processes to be started as necessary. For example, by operating the same number of helper processes as the number of pages recorded in map information, the control unit of the information processing device 1 can execute, in parallel, update instructions put on standby for each page recorded in the map information. In other words, according to the present embodiment, since a degree in which execution of update instructions put on standby is processed in parallel can be increased or reduced in accordance with circumstances, a problem of an imbalance between the number of transactions that can be processed in parallel and the number of transaction logs can be solved.

Therefore, according to the present embodiment, for these reasons, a speed of processing for applying a transaction log to a database can be increased.

Moreover, in the present embodiment, a transaction log created in series is used to update a database. Therefore, according to the present embodiment, a speed of processing for applying a transaction log to a database can be increased without changing a technique related to the creation of the transaction log from a conventional system.

The operation example presented above describes update instructions (INSERT instruction, DELETE instruction) which consider one tuple to be a processing object as an example of update instructions of a database. However, update instructions of a database are not limited to such update instructions which consider one tuple to be a processing object. For example, when executing an UPDATE instruction in a write-once, read-many database, a plurality of tuples are to be processed including deleting an update object tuple and inserting an updated tuple. In this case, among the UPDATE instruction, the main process executes an instruction portion with respect to a tuple having been read to the RAM and records an instruction portion with respect to a tuple not having been read to the RAM in map information. In other words, by handling an update instruction that considers a plurality of tuples to be processing objects as a collection of a plurality of update instructions that consider one tuple to be a processing object, the control unit can process an update instruction that considers a plurality of tuples to be processing objects in a similar manner to an update instruction that considers one tuple to be a processing object.

In addition, in the operation example presented above, the control unit of the information processing device 1 determines that a tuple that is an object of an update instruction becomes a processing object when the tuple is read to a RAM. However, the timing when the control unit determines that an object of an update instruction becomes a processing object is not limited to this example. As another example, the control unit of the information processing device 1 may not determine that a tuple that is an object of an update instruction becomes a processing object when the tuple is simply read to a RAM and may determine that the tuple becomes a processing object when a lock is acquired with respect to the tuple. When a plurality of processes attempt to access an object page, there is a possibility that contents of the object page is changed by another process before processing of the page by a given process is completed. To avoid this situation, the process applies a lock to the page to be accessed. The control unit of the information processing device 1 may detect that a locked object becomes a processing object upon the lock being applied.

§ 2 Second Embodiment

A second embodiment of the present invention can be described in a substantially similar manner to the first embodiment with the exception of a part of the processing. Therefore, portions that can be described in a similar manner to the first embodiment will be omitted as appropriate.

Configuration Example

In the second embodiment, the hardware configuration illustrated in FIG. 3, the relationships among respective processes illustrated in FIG. 4, and matters related to an acquired transaction log are similar to the first embodiment. However, the information processing device 1 according to the second embodiment sequentially refers to records in an acquired transaction log from the first record and processes the records in the acquired transaction log by putting execution of an update instruction on standby with respect to records related to an update instruction for updating data included in a database among records included in the transaction log. In addition, the skipped update instruction is executed either until object data becomes a processing object or upon the object data becoming a processing object.

In other words, the information processing device 1 according to the second embodiment differs from the first embodiment which executes an update instruction with respect to a tuple that is read to the RAM when referring to the transaction log in that all update instructions are temporarily put on standby when processing records of the transaction log.

Operation Example

Next, a specific operation example of the information processing device 1 according to the second embodiment will be described with reference to an update example of a database shown in FIG. 5, an example of an acquired transaction log shown in FIG. 6, and an example of an operational state of the information processing device 1 at a point when a query is received as shown in FIG. 7.

<Main Process>

A main process according to the second embodiment sequentially refers to records in an acquired transaction log from the first record. In addition, unlike the first embodiment, the main process of the second embodiment processes records in the transaction log by putting execution of all update instructions on standby with respect to update instructions for updating data included in a database among records included in the transaction log. On the other hand, with respect to records other than an update instruction such as records related to management of transactions, the main process executes an instruction (for example, update of management information) represented by the records in a similar manner to the first embodiment.

Moreover, in the second embodiment, an update instruction put on standby is recorded in map information in a similar manner to the first embodiment. At least one of contents of the update instruction put on standby and a number of the record is recorded in map information in association with an object (tuple) of the update instruction. However, in the present embodiment, each tuple in the database is managed in page units on the storage device and exchange of data between the storage device and the RAM is performed in page units. In consideration thereof, the main process according to the second embodiment records at least one of contents of an update instruction put on standby and a number of the record in map information in association with a page that includes a tuple to become an object of the update instruction put on standby. In other words, a page corresponds to a "predetermined set" according to the present invention.

Specifically, every time the main process according to the second embodiment refers to a record related to an update instruction of the database such as a 33rd record and a 35th record, the main process records at least one of contents of an update instruction that is represented by the referred record and the number of the record in map information in association with a page that includes a tuple to become an object of the update instruction. Moreover, FIGS. 12 to 15 described below illustrate scenes in which any of contents of an update instruction and a number of a record is recorded in map information.

Moreover, in a similar manner to the first embodiment, when the referred record is a record related to management of transactions, the main process according to the second embodiment updates management information for managing the transactions in accordance with contents represented by the record.

In addition, in a similar manner to the first embodiment, the second embodiment assumes a scene where replication is performed according to the second method illustrated in FIG. 1. However, in a similar manner to the first embodiment, a method of replication to be applied to the second embodiment is not limited to the second method, and the first method illustrated in FIG. 1 may be adopted in the second embodiment. Furthermore, a method of replication that is executed in the second embodiment is not limited to synchronous replication and may instead be asynchronous replication.

Figure 12:
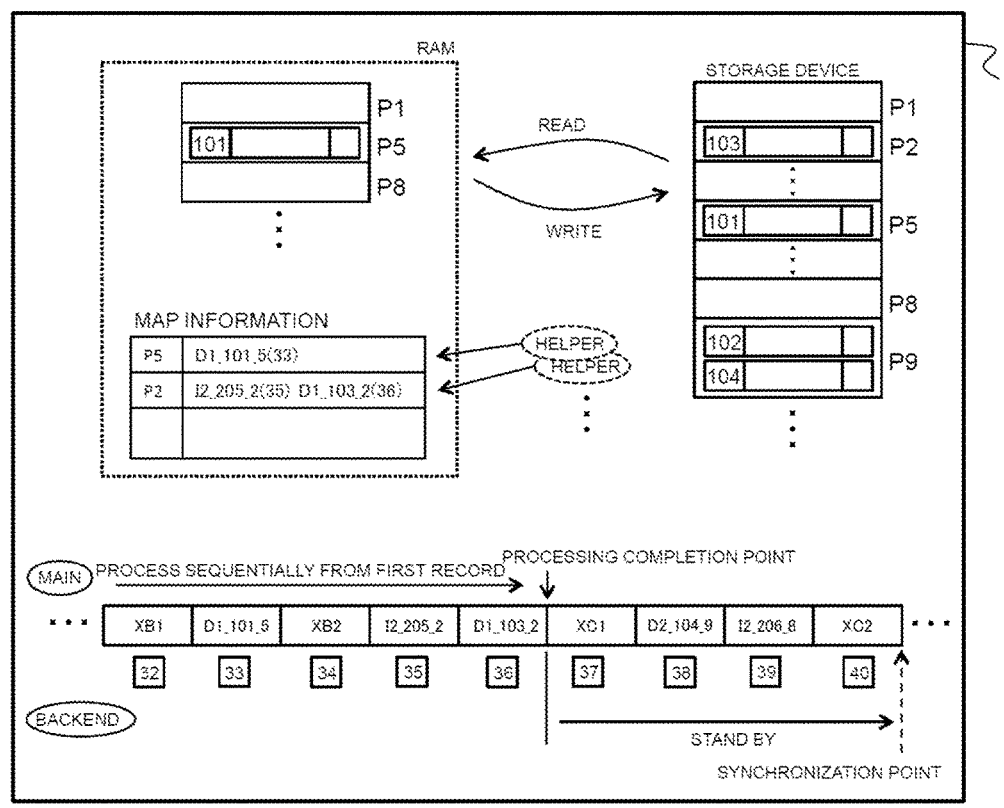
FIG. 12 illustrates an operational state of an information processing device according to an embodiment at a point when processing of a main process according to the embodiment is completed up to a 36th record.

FIG. 12 illustrates an operational state of the information processing device 1 in the second embodiment at a point when processing of the main process has been completed up to a 36th record following the state illustrated in FIG. 7.

Among 32nd to 36th records, the 33rd, 35th, and 36th records are records related to update instructions of the database. In addition, the 32nd and 34th records are records related to management of transactions and are related to instructions other than update instructions.

Therefore, the main process first refers to the 32nd record and executes an instruction represented by the 32nd record in a similar manner to the first embodiment. Specifically, for example, the main process updates management information so as to indicate that the execution of a 1st transaction is in progress.

After processing the 32nd record, the main process refers to the next 33rd record. At this point, an object of an update instruction (D1_101_5) represented by the 33rd record is read onto the RAM. However, unlike the first embodiment, the main process puts execution of the update instruction (D1_101_5) represented by the 33rd record on standby. In addition, the main process records contents of the update instruction (D1_101_5) represented by the 33rd record or a record number (33) in map information in association with a page number (P5).

After processing the 33rd record, the main process refers to the next 34th record and executes the instruction represented by the 34th record in a similar manner to the first embodiment. Specifically, for example, the main process updates management information so as to indicate that the execution of a 2nd transaction is in progress.

After processing the 34th record, the main process refers to the next 35th record and puts execution of an update instruction (I2_205_2) represented by the 35th record on standby. In addition, the main process records contents of the update instruction (I2_205_2) represented by the 35th record or a record number (35) in map information in association with a page number (P2).

After processing the 35th record, the main process refers to the next 36th record and puts execution of an update instruction (D1_103_2) represented by the 36th record on standby. In addition, the main process records contents of the update instruction (D1_103_2) represented by the 36th record or a record number (36) in map information in association with the page number (P2). Accordingly, processing of records up to the 36th record is completed.

Moreover, execution by the back-end process is put on standby in a similar manner to the first embodiment because processing by the main process has not been completed up to the 40th record that is a synchronization point set at the point when a query is received.

Figure 13:
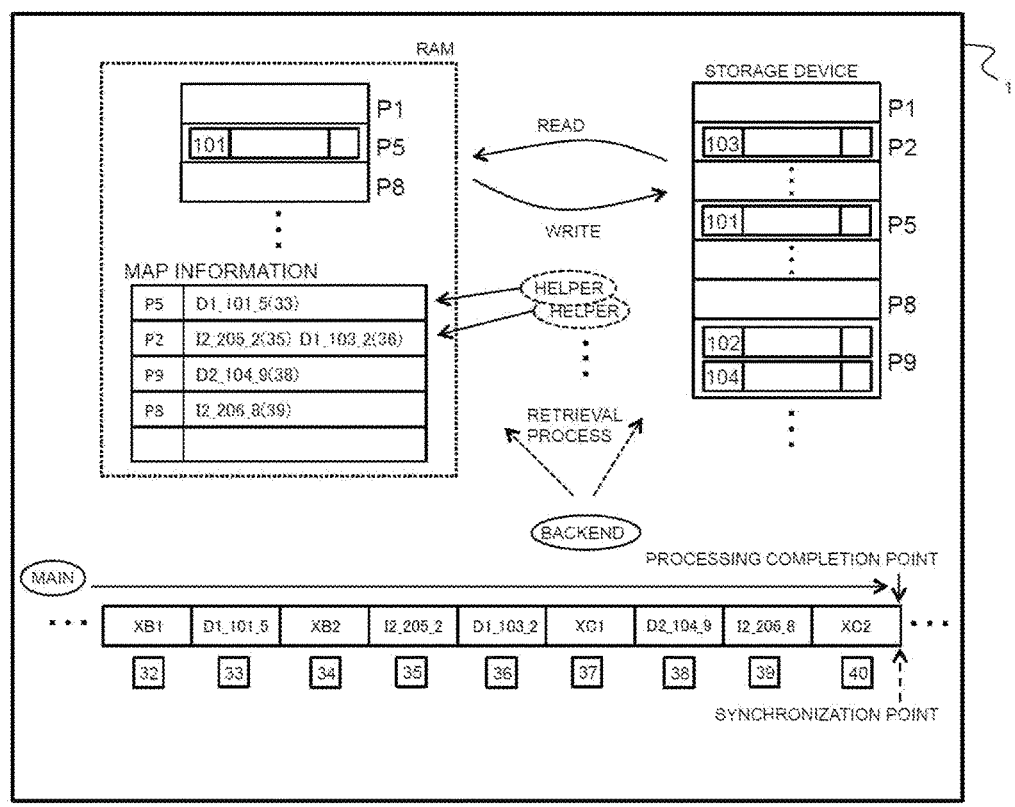
FIG. 13 illustrates an operational state of an information processing device according to an embodiment at a point when processing of a main process according to the embodiment is completed up to a record with a synchronization point.

FIG. 13 illustrates an operational state of the information processing device 1 at a point when processing of the main process has been completed up to the synchronization point (40th record) set at the point shown in FIG. 7 following the state illustrated in FIG. 12.

Among 37th to 40th records, the 38th and 39th records are records related to update instructions of the database. In addition, the 37th and 40th records are records related to management of transactions and are related to instructions other than update instructions.

Therefore, the main process first refers to the 37th record and executes an instruction represented by the 37th record in a similar manner to the first embodiment. Specifically, for example, the main process updates management information so as to indicate that the execution of the 1st transaction is committed.

After processing the 37th record, the main process refers to the next 38th record and puts execution of an update instruction (D2_104_9) represented by the 38th record on standby. In addition, the main process records contents of the update instruction (D2_104_9) represented by the 38th record or a record number (38) in map information in association with the page number (P9).

After processing the 38th record, the main process refers to the next 39th record. At this point, an object of an update instruction (I2_206_8) represented by the 39th record is read onto the RAM. However, unlike the first embodiment, the main process puts execution of the update instruction (I2_206_8) represented by the 39th record on standby. In addition, the main process records contents of the update instruction (I2_206_8) represented by the 39th record or a record number (39) in map information in association with the page number (P8).

After processing the 39th record, the main process refers to the next 40th record and executes the instruction represented by the 40th record in a similar manner to the first embodiment. Specifically, for example, the main process updates management information so as to indicate that the execution of the 2nd transaction is committed.

Accordingly, since processing by the main process is completed up to the 40th record that is a synchronization point set at the point when the query is received, the back-end process is now able to execute the retrieval process on the object query.

<Helper Process>

A helper process according to the second embodiment refers to map information and executes an update instruction put on standby in a similar manner to the first embodiment.

Figure 14:
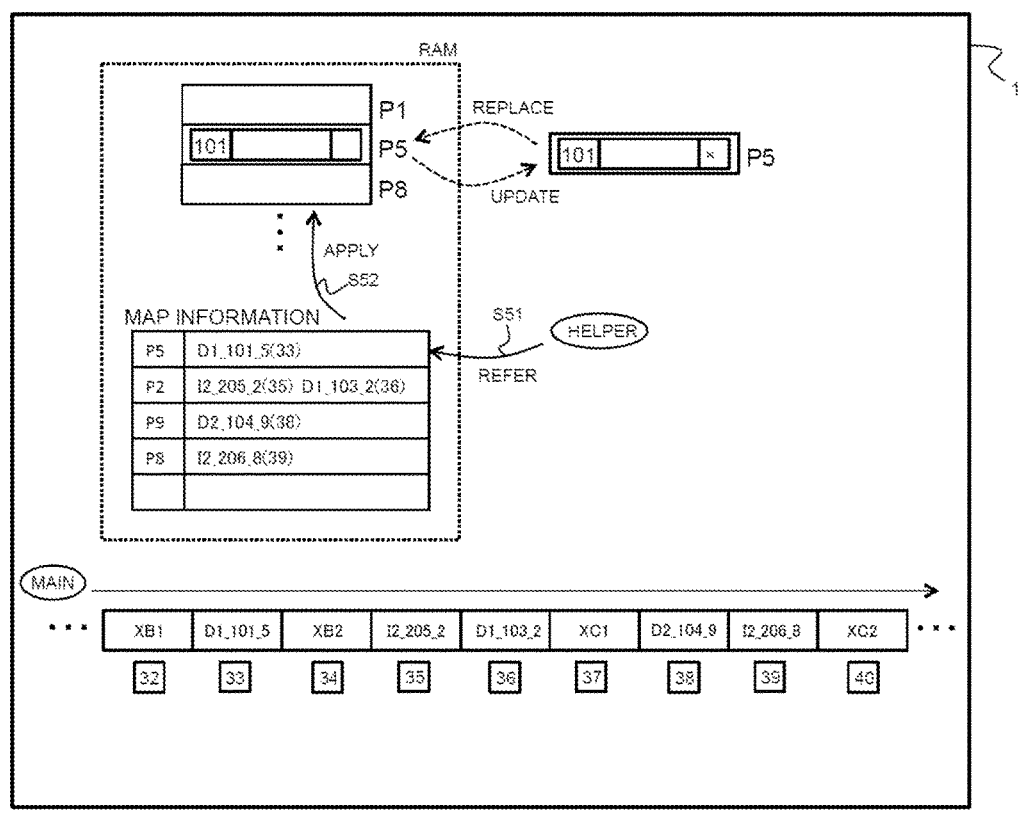
FIG. 14 illustrates a processing procedure of a helper process according to an embodiment.

FIG. 14 illustrates a processing procedure of the helper process according to the second embodiment. Moreover, FIG. 14 illustrates a scene where processing by the helper process is started before a retrieval process by the back-end process shown in FIG. 13 is started.

In step S51, the helper process refers to map information and determines whether or not there is an update instruction put on standby. When an update instruction put on standby is not recorded in the map information, the helper process ends processing. On the other hand, when an update instruction put on standby is recorded in the map information, the helper process selects an object to be processed by the helper process in accordance with management units and advances processing to step S52. Moreover, in the scene illustrated in FIG. 14, the helper process selects page P5 as an object to be processed by the helper process.

In step S52, the helper process determines whether or not the selected page exists on the RAM. When the selected page exists on the RAM, the helper process executes an update instruction put on standby (an update instruction recorded in map information). On the other hand, when the selected page does not exist on the RAM, as illustrated in FIG. 10 according to the first embodiment, the helper process reads the selected page from the storage device onto the RAM and executes an update instruction put on standby with respect to the read page (an update instruction recorded in map information).

In the scene illustrated in FIG. 14, the page (P5) selected by the helper process exists on the RAM. Therefore, the helper process executes the update instruction (D1_101_5) which is put on standby with respect to P5 and adds a deletion point to the tuple with the row number 101. Subsequently, the helper process deletes a record related to the processed update instruction from the map information and ends processing.

Moreover, the second embodiment and the first embodiment share the following points when a plurality of update instructions are put on standby with respect to a selected page: the helper process executes the update instructions that are put on standby in an order in which the update instructions are recorded in the map information; the number of helper processes in operation may be increased or reduced by generating or deleting, or starting or stopping, helper processes; a certain number of helper processes may be started up in advance; and the helper process may execute processing as appropriate at timings other than the timings shown in the present operation example. Therefore, a description of these points will be omitted.

<Back-End Process>

A back-end process according to the second embodiment executes a retrieval process in response to a retrieval request (query) with respect to the database from a client PC in a similar manner to the first embodiment. When executing the retrieval process, the back-end process refers to map information and determines whether or not an update instruction put on standby with respect to a page to be a retrieval object exists. When an update instruction put on standby with respect to a page to be a retrieval object does not exist, the back-end process executes a retrieval process on the page. On the other hand, when an update instruction put on standby with respect to the page to be a retrieval object exists, the back-end process executes a retrieval process on the page after executing the update instruction put on standby. Moreover, processing by the back-end process for applying an update instruction recorded in map information may be executed by the helper process in a similar manner to the first embodiment.

Figure 15:
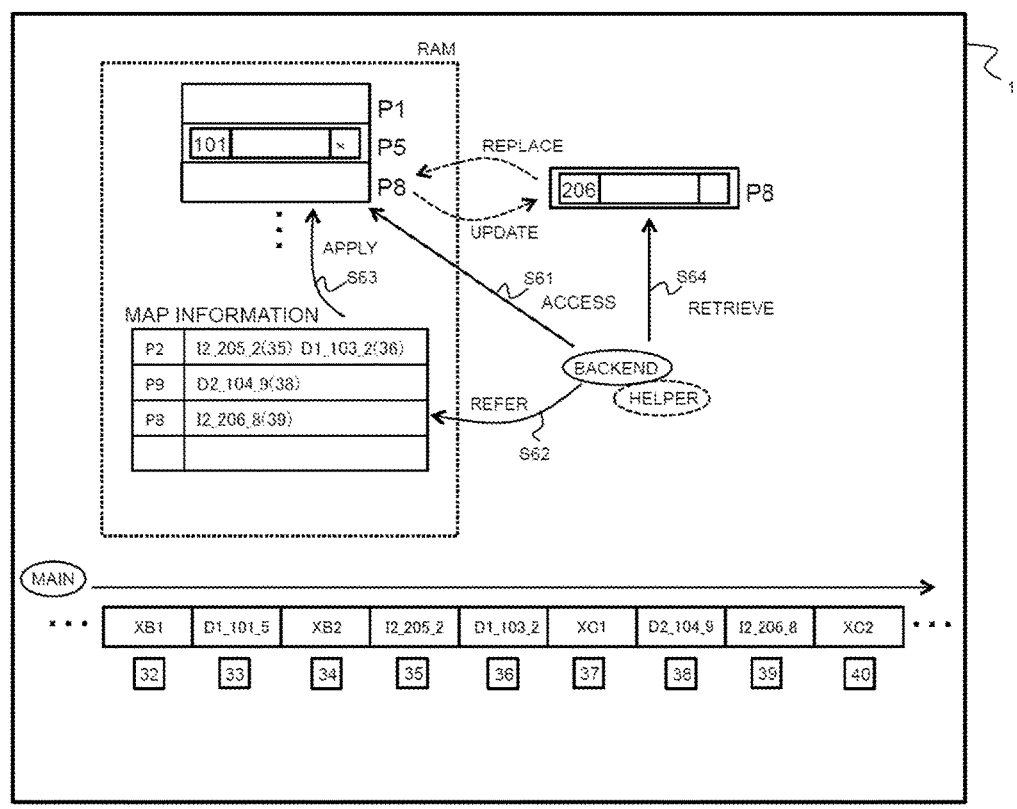
FIG. 15 illustrates a processing procedure of a back-end process according to an embodiment.

FIG. 15 illustrates a processing procedure of the back-end process according to the second embodiment. Moreover, FIG. 15 illustrates a scene where a retrieval process by the back-end process is started following the states illustrated in FIGS. 13 and 14.

In step S61, in order to extract a tuple corresponding to contents of a received query, the back-end process accesses a page included in a region associated with the query and sets the accessed page as an object of a retrieval process. FIG. 15 illustrates a scene where the back-end process accesses a page (P8) existing on the RAM. On the other hand, when the accessed page does not exist on the RAM, as illustrated in FIG. 11 according to the first embodiment, the back-end process accesses the storage device and reads an object page from the storage device onto the RAM.

Moreover, when setting the accessed page as an object of a retrieval process, the back-end process acquires a lock with respect to the accessed page. The control unit of the information processing device 1 according to the second embodiment may handle the acquisition of a lock with respect to an object page as an example of a factor when determining that the object page has become a processing object. In other words, the control unit of the information processing device 1 according to the second embodiment may determine that the object page has become a processing object upon acquisition of a lock with respect to the object page.

Moreover, an operation causing a determination that the object page has become a processing object to be made may be set as appropriate in accordance with embodiments and is not limited to the acquisition of a lock.

In step S62, the back-end process refers to map information and determines whether or not there is an update instruction put on standby with respect to the accessed page. When an update instruction put on standby with respect to the accessed page is not recorded in the map information, the back-end process advances processing to step S64. On the other hand, when an update instruction put on standby with respect to the accessed page is recorded in the map information, the back-end process advances processing to step S63. In FIG. 15, since an update instruction (I2_206_8) put on standby with respect to the accessed page (P8) exists, the processing is advanced to step S63.

In step S63, the back-end process executes an update instruction put on standby with respect to the accessed page on the RAM. In FIG. 15, the back-end process executes an update instruction (I2_206_8) put on standby with respect to P8. In other words, the back-end process inserts the tuple with the row number 206 into P8. In addition, after executing all update instructions put on standby with respect to the accessed page, the back-end process deletes records related to the processed update instructions from the map information.

In step S64, the back-end process executes a retrieval process in accordance with the received query with respect to the accessed page on the RAM. In addition, when regions that have not been accessed remain in the retrieval range, the back-end process returns to step S61 and repeats processing. On the other hand, when regions that have not been accessed do not remain in the retrieval range, the back-end process sends back a result of the retrieval process to the client PC as a response to the query and ends processing.

Moreover, the second embodiment and the first embodiment share the following points: the back-end process may access object pages one page at a time or may access a plurality of pages at the same time; when a plurality of update instructions are put on standby with respect to an accessed page, the back-end process executes the update instructions put on standby in an order in which the update instructions are recorded in the map information; the number of back-end processes in operation may be increased or reduced by generating or deleting, or starting or stopping, back-end processes; and the back-end process may relegate processing related to updating of pages to the helper process. Therefore, a description of these points will be omitted.

<Working Effect of the Second Embodiment>

In the second embodiment, when focusing on the tuple with the row number 206, a description similar to that of the tuple with the row number 205 illustrated in FIG. 11 according to the first embodiment can be given. Specifically, at a point (step S61) when the tuple becomes an object of a retrieval process by the back-end process, an update instruction related to the tuple which is represented by a record (39th record) preceding a synchronization point related to the retrieval process has not been executed and is on standby. However, at a point (step S64) when the retrieval process is executed, the update instruction represented by the 39th record has already been executed by the back-end process (or the helper process). Therefore, the tuple with the row number 206 becomes an object of the retrieval process without incident.

In other words, according to the second embodiment, since a standby time for retrieval can be reduced while securing consistency between databases for the same reasons as the first embodiment, a speed of processing for applying a transaction log to a database can be increased. In addition, even in the second embodiment, since a transaction log created in series is used to update a database, speed of processing for applying a transaction log to a database can be increased without changing a technique related to the creation of the transaction log from a conventional system.

On the other hand, unlike the first embodiment, page P8 that is an object of an update instruction for adding the tuple with the row number 206 recorded in the map information already exists on the RAM at a point when the main process refers to the 39th record. As described in the first embodiment, pages existing on the RAM may become objects of processing at any time. However, since the pages do not necessarily become objects of processing immediately, the main process may put update instructions with respect to such pages on standby. In addition, as will be described later, even when the pages have just become objects of processing, the main process may put update instructions with respect to the pages on standby. In consideration thereof, the main process according to the second embodiment puts update instructions with respect to pages existing on the RAM on standby in a similar manner to update instructions with respect to pages that do not exist on the RAM, and temporarily records the update instructions in map information.

In other words, regardless of whether or not update instructions exist on the RAM, the main process according to the second embodiment handles update instructions with respect to pages existing on the RAM and update instructions with respect to pages that do not exist on the RAM in a similar manner. Therefore, the main process according to the second embodiment can omit processing for determining whether or not a page regarding a tuple to become an object of an update instruction represented by a record in a transaction log which is included in the operations of the main process according to the first embodiment.

In addition, in the second embodiment, since the main process does not execute an update instruction for the database that is represented by a record in a transaction log, a state of the page read onto the RAM is not changed. Therefore, unlike the main process according to the first embodiment, the main process according to the second embodiment can execute processing without its operation being hindered by other processes (for example, the helper process and the back-end process) which change the state of the page read onto the RAM.

For example, when the main process refers to an update instruction, if a page related to a tuple to become an object of the update instruction exists on the RAM and is already an object of processing of the back-end process, the back-end process has already acquired a lock with respect to the page. Therefore, when immediately executing the update instruction, the main process must stand by until the back-end process completes a retrieval process on the page and releases the lock. In the second embodiment, since the main process need no longer stand by for a lock to be released, the main process can execute processing without its operation being hindered by other processes.

In addition, the back-end process having set the page as an object of processing executes a retrieval process based on a state of the database at a point when a lock is acquired. Therefore, the update instruction need only be executed after the lock is released and before the page next becomes an object of processing. As a result, even when the a page related to a tuple to become an object of an update instruction has just become an object of processing, the main process may put the update instruction on standby without impairing consistency between databases with respect to the retrieval.

For these reasons, in the second embodiment, processing of the main process can be executed simpler and at a higher speed than the first embodiment. Therefore, when applying this method of updating a database to synchronous replication, the second embodiment enables the time between reception of a query and start of a retrieval process to be shortened as compared to the first embodiment.

When an update instruction is put on standby, the update instruction is referred to upon being put on standby and upon being executed. In other words, compared to a case where an update instruction is executed immediately, the number of times the update instruction is referred to increases when the update instruction is put on standby. Therefore, in the second embodiment, since the number of update instructions put on standby increases in comparison to the first embodiment, an amount of processing related to the referring of the update instructions increases.

However, as described in the operation example presented above, processing of the increased portion can be performed in parallel. Therefore, in a system with high parallelism, since a time until processing of the main process is completed becomes a bottleneck when executing a retrieval process, the second embodiment which enables the main process to be executed at a higher speed is more favorable than the first embodiment. In other words, when an amount of processing that increases regarding the referring of update instructions is smaller than an amount of processing that decreases due to more processes being performed in parallel, a more favorable result can be obtained using the second embodiment than the first embodiment.

Moreover, the second embodiment is similar to the first embodiment in that update instructions of the database are not limited to update instructions that set one tuple as a processing object.

What is claimed is:

1. An information processing method executing on a computer, which updates a database using a transaction log, manages tuples in the database in a unit of a predetermined set including at least one of the tuples, and performs reading of the tuples from a storage device onto a memory and writing of the tuples from the memory onto the storage device in the unit of the predetermined set, the method comprising the steps of:

acquiring the transaction log;

processing records in the acquired transaction log by sequentially referring to the records in the acquired transaction log from a first record, and with respect to a record related to an update instruction for updating data included in the database from among the records included in the transaction log, executing the update instruction represented by the record when the predetermined set including an object tuple of the update instruction is read onto the memory of the computer and putting an execution of the update instruction represented by the record on standby regardless of whether or not another record of an unapplied update instruction for the object tuple exists when the predetermined set including the object tuple of the update instruction is not read onto the memory of the computer;

when putting the execution of the update instruction on standby, the update instruction being indicated by the record, recording at least one of contents of the update instruction put on standby and a number of the record in map information in association with the predetermined set including the object tuple of the update instruction in order to show that the update instruction put on standby exists with respect to the object tuple of the update instruction;

reading the predetermined set including an object tuple of a retrieval process in the database from the storage device onto the memory;

executing a plurality of update instructions put on standby including the update instruction for object tuples of the plurality of update instructions included in the predetermined set read onto the memory, in numerical order of the record relating to the plurality of update instructions, with respect to any tuple included in the predetermined set, which includes the object tuple of the update instruction put on standby and is read onto the memory, by referring to the map information, until the retrieval process relating to any tuple included in the predetermined set is executed; and saving updated tuples by writing the predetermined set including the updated tuples from the memory onto the storage device, after updating the object tuples.

2. The information processing method according to claim 1, wherein the acquiring of the transaction log acquires the transaction log that is created in series by another computer in order to perform replication between a database of the other computer and the database of the computer.

3. The information processing method according to claim 1, further comprising putting the retrieval process to be implemented on the database on standby until processing on a record of the transaction log that is required to be processed in relation to the retrieval process is completed.

4. The information processing method according to claim 1, wherein the update instruction put on standby is executed after a retrieval request with respect to the database has occurred and until the retrieval process is executed.

5. The information processing method according to claim 1, further comprising preferentially executing the update instruction related to the predetermined set relating to the retrieval process, by reading the predetermined set relating to the retrieval process onto the memory.

6. An information processing method executing on a computer, which updates a database using a transaction log, manages tuples in the database in a unit of a predetermined set including at least one of the tuples, and performs reading of the tuples from a storage device onto a memory and writing of the tuples from the memory onto the storage device in the unit of the predetermined set, the method comprising the steps of:

acquiring the transaction log;

processing records in the acquired transaction log by sequentially referring to records in the acquired transaction log from a first record, and with respect to a record related to an update instruction for updating data included in the database from among the records included in the transaction log, putting an execution of the update instruction on standby regardless of whether or not another record of an unapplied update instruction for the object tuple exists;

when putting the execution of the update instruction on standby, the update instruction being indicated by the record, recording at least one of contents of the update instruction put on standby and a number of the record in map information in association with the predetermined set including the object tuple of the update instruction in order to show that the update instruction put on standby exists with respect to the object tuple of the update instruction;

reading the predetermined set including an object tuple of a retrieval process in the database from the storage device onto the memory;

executing a plurality of update instructions put on standby including the update instruction for object tuples of the plurality of update instructions included in the predetermined set read onto the memory, in numerical order of the record relating to the plurality of update instructions, with respect to any tuple included in the predetermined set, which includes the object tuple of the update instruction put on standby and is read onto the memory, by referring to the map information, until the retrieval process relating to any tuple included in the predetermined set is executed; and saving updated tuples by writing the predetermined set including the updated tuples from the memory onto the storage device, after updating the object tuples.

7. The information processing method according to claim 6, wherein the acquiring of the transaction log acquires the transaction log that is created in series by another computer in order to perform replication between a database of the other computer and the database of the computer.

8. The information processing method according to claim 6, further comprising putting the retrieval process to be implemented on the database on standby until processing on a record of the transaction log that is required to be processed in relation to the retrieval process is completed.

9. The information processing method according to claim 6, wherein the update instruction put on standby is executed after a retrieval request with respect to the database has occurred and until the retrieval process is executed.

10. The information processing method according to claim 6, further comprising preferentially executing the update instruction related to the predetermined set relating to the retrieval process, by reading the predetermined set relating to the retrieval process onto the memory.

11. An information processing device, comprising:

a database;

a memory;

a storage device; and a processor configured to:

update the database using a transaction log;

manage tuples in the database in a unit of a predetermined set including at least one of the tuples;

perform reading of the tuples from the storage device onto the memory and writing of the tuples from the memory onto the storage device in the unit of the predetermined set;

acquire the transaction log;

process records in the acquired transaction log by sequentially referring to the records in the acquired transaction log from a first record, and with respect to a record related to an update instruction for updating data included in the database from among the records included in the transaction log, executing the update instruction represented by the record when the predetermined set including an object tuple of the update instruction is read onto the memory and putting an execution of the update instruction represented by the record on standby regardless of whether or not another record of an unapplied update instruction for the object tuple exists when the predetermined set including an object tuple of the update instruction is not read onto the memory;

when putting the execution of the update instruction on standby, the update instruction being indicated by the record, record at least one of contents of the update instruction put on standby and a number of the record in map information in association with the predetermined set including the object tuple of the update instruction in order to show that the update instruction put on standby exists with respect to the object tuple of the update instruction;

read the predetermined set including an object tuple of a retrieval process in the database from the storage device onto the memory;

execute a plurality of update instructions put on standby including the update instruction for object tuples of the plurality of update instructions included in the predetermined set read onto the memory, in numerical order of the record relating to the plurality of update instructions, with respect to any tuple included in the predetermined set, which includes the object tuple of the update instruction put on standby and is read onto the memory, by referring to the map information, until the retrieval process relating to any tuple included in the predetermined set is executed; and save updated tuples by writing the predetermined set including the updated tuples from the memory onto the storage device, after updating the object tuples.

12. The information processing device according to claim 11, wherein the update instruction put on standby is executed after a retrieval request with respect to the database has occurred and until the retrieval process is executed.

13. The information processing device according to claim 11, wherein the processor is further configured to preferentially execute the update instruction related to the predetermined set relating to the retrieval process, by reading the predetermined set relating to the retrieval process onto the memory.

14. A non-transitory computer-readable medium on which is recorded a program causing a computer, which updates a database using a transaction log, manages tuples in the database in a unit of a predetermined set including at least one of the tuples, and performs reading of the tuples from a storage device onto a memory and writing of the tuples from the memory onto the storage device in the unit of the predetermined set, to execute:

acquiring the transaction log;

processing records in the acquired transaction log by sequentially referring to the records in the acquired transaction log from a first record, and with respect to a record related to an update instruction for updating data included in the database from among the records included in the transaction log, executing the update instruction represented by the record when the predetermined set including an object tuple of the update instruction is read onto the memory of the computer and putting an execution of the update instruction represented by the record on standby regardless of whether or not another record of an unapplied update instruction for the object tuple exists when the predetermined set including the object tuple of the update instruction is not read onto the memory of the computer;

when putting the execution of the update instruction on standby, the update instruction being indicated by the record, recording at least one of contents of the update instruction put on standby and a number of the record in map information in association with the predetermined set including the object tuple of the update instruction in order to show that the update instruction put on standby exists with respect to the object tuple of the update instruction;

reading the predetermined set including an object tuple of a retrieval process in the database from the storage device onto the memory;

executing a plurality of update instructions put on standby including the update instruction for object tuples of the plurality of update instructions included in the predetermined set read onto the memory, in numerical order of the record relating to the plurality of update instructions, with respect to any tuple included in the predetermined set, which includes the object tuple of the update instruction put on standby and is read onto the memory, by referring to the map information, until the retrieval process relating to any tuple included in the predetermined set is executed; and saving updated tuples by writing the predetermined set including the updated tuples from the memory onto the storage device, after updating the object tuples.

15. The non-transitory computer-readable medium according to claim 14, wherein the update instruction put on standby is executed after a retrieval request with respect to the database has occurred and until the retrieval process is executed.

16. The non-transitory computer-readable medium according to claim 14, wherein the program causes the computer to preferentially execute the update instruction related to the predetermined set relating to the retrieval process, by reading the predetermined set relating to the retrieval process onto the memory.

17. An information processing device, comprising:
a database;
a memory;
a storage device; and
a processor configured to:
update the database using a transaction log;
manage tuples in the database in a unit of a predetermined set including at least one of the tuples;
perform reading of the tuples from the storage device onto the memory and writing of the tuples from the memory onto the storage device in the unit of the predetermined set;
acquire the transaction log;
process records in the acquired transaction log by sequentially referring to records in the acquired transaction log from a first record, and with respect to a record related to an update instruction for updating data included in the database from among the records included in the transaction log, putting an execution of the update instruction on standby regardless of whether or not another record of an unapplied update instruction for the object tuple exists;
when putting the execution of the update instruction on standby, the update instruction being indicated by the record, record at least one of contents of the update instruction put on standby and a number of the record in map information in association with the predetermined set including the object tuple of the update instruction in order to show that the update instruction put on standby exists with respect to the object tuple of the update instruction;
read the predetermined set including an object tuple of a retrieval process in the database from the storage device onto the memory;

execute a plurality of update instructions put on standby including the update instruction for object tuples of the plurality of update instructions included in the predetermined set read onto the memory, in numerical order of the record relating to the plurality of update instructions, with respect to any tuple included in the predetermined set, which includes the object tuple of the update instruction put on standby and is read onto the memory, by referring to the map information, until the retrieval process relating to any tuple included in the predetermined set is executed; and save updated tuples by writing the predetermined set including the updated tuples from the memory onto the storage device, after updating the object tuples.

18. The information processing device according to claim 17, wherein the update instruction put on standby is executed after a retrieval request with respect to the database has occurred and until the retrieval process is executed.

19. The information processing device according to claim 17, wherein the processor is further configured to preferentially execute the update instruction related to the predetermined set relating to the retrieval process, by reading the predetermined set relating to the retrieval process onto the memory.

20. A non-transitory computer-readable medium on which is recorded a program causing a computer, which updates a database using a transaction log, manages tuples in the database in a unit of a predetermined set including at least one of the tuples, and performs reading of the tuples from a storage device onto a memory and writing of the tuples from the memory onto the storage device in the unit of the predetermined set, to execute:

processing records in the acquired transaction log by sequentially referring to records in the acquired transaction log from a first record, and with respect to a record related to an update instruction for updating data included in the database from among the records included in the transaction log, putting an execution of the update instruction on standby regardless of whether or not another record of an unapplied update instruction for the object tuple exists;

when putting the execution of the update instruction on standby, the update instruction being indicated by the record, recording at least one of contents of the update instruction put on standby and a number of the record in map information in association with the predetermined set including the object tuple of the update instruction in order to show that the update instruction put on standby exists with respect to the object tuple of the update instruction;

reading the predetermined set including an object tuple of a retrieval process in the database from the storage device onto the memory;

executing a plurality of update instructions put on standby including the update instruction for object tuples of the plurality of update instructions included in the predetermined set read onto the memory, in numerical order of the record relating to the plurality of update instructions, with respect to any tuple included in the predetermined set, which includes the object tuple of the update instruction put on standby and is read onto the memory, by referring to the map information, until the retrieval process relating to any tuple included in the predetermined set is executed; and saving updated tuples by writing the predetermined set including the updated tuples from the memory onto the storage device, after updating the object tuples.

21. The non-transitory computer-readable medium according to claim 20, wherein the update instruction put on standby is after a retrieval request with respect to the database has occurred and until the retrieval process is executed.

22. The non-transitory computer-readable medium according to claim 20, wherein the program causes the computer to preferentially execute the update instruction related to the predetermined set relating to the retrieval process, by reading the predetermined set relating to the retrieval process onto the memory.

* * * * *